US010834642B2

(12) United States Patent
Baghel et al.

(10) Patent No.: US 10,834,642 B2
(45) Date of Patent: Nov. 10, 2020

(54) DYNAMIC RESOURCE SHARING

(71) Applicant: QUALCOMM Incorporated, San Diego, CA (US)

(72) Inventors: Sudhir Kumar Baghel, Hillsborough, NJ (US); Zhibin Wu, Bedminster, NJ (US); Shailesh Patil, Raritan, NJ (US); Junyi Li, Chester, NJ (US); Georgios Tsirtsis, London (GB)

(73) Assignee: Qualcomm Incorporated, San Diego, CA (US)

( * ) Notice: Subject to any disclaimer, the term of this patent is extended or adjusted under 35 U.S.C. 154(b) by 79 days.

(21) Appl. No.: 15/807,441

(22) Filed: Nov. 8, 2017

(65) Prior Publication Data

US 2018/0234889 A1 Aug. 16, 2018

Related U.S. Application Data

(60) Provisional application No. 62/457,748, filed on Feb. 10, 2017.

(51) Int. Cl.
*H04W 28/26* (2009.01)
*H04W 72/04* (2009.01)
(Continued)

(52) U.S. Cl.
CPC ........... *H04W 28/26* (2013.01); *H04W 8/005* (2013.01); *H04W 24/08* (2013.01); *H04W 48/18* (2013.01);
(Continued)

(58) Field of Classification Search
CPC .............................. H04W 28/26; H04W 24/08
See application file for complete search history.

(56) References Cited

U.S. PATENT DOCUMENTS

2011/0032911 A1* 2/2011 Choi ..................... H04W 48/18 370/335
2013/0230015 A1* 9/2013 Hoymann ............. H04L 5/0053 370/329

(Continued)

OTHER PUBLICATIONS

Intel Corporation: "Design Considerations on LTE-V2V Coexistence with DSRC Technology", 3GPP Draft; R1-1609458 INTEL—DSRC, 3rd Generation Partnership Project (3GPP), Mobile Competence Centre, 650, Route Des Lucioles; F-06921 Sophia-Antipolis Cedex, France, vol. RAN WG1, No. Lisbon, Portugal; Oct. 10, 2016-Oct. 14, 2016, Oct. 9, 2016 (Oct. 9, 2016), 7 Pages, XP051149498, Retrieved from the Internet: URL: http://www.3gpp.org/ftp/Meetings_3GPP_SYNC/RAN1/Docs/ [retrieved on Oct. 9, 2016].

(Continued)

*Primary Examiner* — Samina F Choudhry
(74) *Attorney, Agent, or Firm* — Loza & Loza, LLP

(57) ABSTRACT

The disclosure relates in some aspects to sharing wireless communication resources. For example, a first type of device allocated to use a first resource pool may dynamically use a second resource pool allocated for a second type of device. The first type of device may use an entry criteria to determine whether to use the second resource pool. In some aspects, the entry criteria may specify that resource sharing is permitted if a ratio of resources used by devices of the second type (relative to the total resources in the second resource pool) is less than a threshold. In addition, the first type of device may use an exit criteria to determine whether to stop using the second resource pool. In some aspects, the exit criteria may specify that resource sharing should stop if a ratio of resources used by devices of the second type is greater than a threshold.

20 Claims, 13 Drawing Sheets

(51) Int. Cl.

| | |
|---|---|
| ***H04W 8/00*** | (2009.01) |
| ***H04W 48/18*** | (2009.01) |
| ***H04W 24/08*** | (2009.01) |
| ***H04W 72/00*** | (2009.01) |
| ***H04W 72/10*** | (2009.01) |
| *H04W 92/18* | (2009.01) |
| *H04W 88/06* | (2009.01) |
| *H04W 24/02* | (2009.01) |
| *H04W 28/18* | (2009.01) |

(52) U.S. Cl.
CPC ..... *H04W 72/005* (2013.01); *H04W 72/0486* (2013.01); *H04W 72/10* (2013.01); *H04W 24/02* (2013.01); *H04W 28/18* (2013.01); *H04W 88/06* (2013.01); *H04W 92/18* (2013.01)

(56) References Cited

U.S. PATENT DOCUMENTS

2015/0023165 A1* 1/2015 Ye .................... H04W 36/0094 370/230
2015/0117398 A1* 4/2015 Yang ................ H04W 36/0005 370/331
2017/0134080 A1* 5/2017 Rahman ............... H04B 7/0456
2018/0007625 A1* 1/2018 Yu ......................... H04W 72/12
2018/0092007 A1* 3/2018 Ekici ................... H04W 52/245
2018/0359713 A1* 12/2018 Boban ................. H04W 52/242
2019/0013881 A1* 1/2019 Olesen ................. H04B 17/318
2019/0069218 A1* 2/2019 Ribeiro ................. H04W 48/12

OTHER PUBLICATIONS

International Search Report and Written Opinion—PCT/US2018/015435—ISA/EPO—dated Apr. 18, 2018.

LG Electronics: "Considerations on the Co-Channel Coexistence of Multiple RATs for V2X", 3GPP Draft; R1-1609185 Multi Rat Co-Channel Coexistence, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-8, XP051149231, Retrieved from the Internet: URL: http://www.3gpp.org/ftp/Meetings_3GPP_SYNC/RAN1/Docs/ [retrieved on Oct. 9, 2016] the whole document.

* cited by examiner

DYNAMIC RESOURCE SHARING

CROSS-REFERENCE TO RELATED APPLICATION(S)

This application claims priority to and the benefit of provisional patent application No. 62/457,748 filed in the U.S. Patent and Trademark Office on Feb. 10, 2017, the entire content of which is incorporated herein by reference.

INTRODUCTION

Various aspects of the present disclosure relate generally to wireless communication and, more particularly but not exclusively, to sharing wireless communication resources.

Wireless communication networks are widely deployed to provide various communication services such as telephony, video, data, messaging, broadcasts, and so on. Such networks, which are usually multiple access networks, support communications for multiple users by sharing the available network resources.

As the demand for mobile broadband access continues to increase, research and development continue to advance wireless communication technologies to meet the growing demand for mobile broadband access and to advance and enhance the user experience. However, as new radio access technologies are developed, different radio access technologies may compete for the same limited wireless communication resources. Accordingly, there is a need for techniques that enable efficient sharing of wireless communication resources.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: determine, from a device-to-device communication resource pool allocated for a first radio access technology (RAT), an indication of use of the resource pool for communication using the first RAT; compare the indication to a threshold; determine, based on the comparison, whether to use the resource pool for communication using a second RAT; and communicate data via the resource pool using the second RAT if the determination of whether to use the resource pool indicates that the resource pool is to be used.

Another aspect of the disclosure provides a method of communication including: determining, from a device-to-device communication resource pool allocated for a first radio access technology (RAT), an indication of use of the resource pool for communication using the first RAT; comparing the indication to a threshold; determining, based on the comparison, whether to use the resource pool for communication using a second RAT; and communicating data via the resource pool using the second RAT if the determination of whether to use the resource pool indicates that the resource pool is to be used.

Another aspect of the disclosure provides an apparatus configured for communication. The apparatus including: means for determining, from a device-to-device communication resource pool allocated for a first radio access technology (RAT), an indication of use of the resource pool for communication using the first RAT; means for comparing the indication to a threshold; means for determining, based on the comparison, whether to use the resource pool for communication using a second RAT; and means for communicating data via the resource pool using the second RAT if the determination of whether to use the resource pool indicates that the resource pool is to be used.

Another aspect of the disclosure provides a non-transitory computer-readable medium storing computer-executable code, including code to: determine, from a device-to-device communication resource pool allocated for a first radio access technology (RAT), an indication of use of the resource pool for communication using the first RAT; compare the indication to a threshold; determine, based on the comparison, whether to use the resource pool for communication using a second RAT; and communicate data via the resource pool using the second RAT if the determination of whether to use the resource pool indicates that the resource pool is to be used.

In one aspect, the disclosure provides an apparatus configured for communication that includes a memory and a processor coupled to the memory. The processor and the memory are configured to: determine, from a device-to-device communication resource pool allocated for a first radio access technology (RAT), a percentage of the resource pool that is being used for communication using the first RAT; compare the percentage to a threshold; determine, based on the comparison, to use the resource pool for communication using a second RAT; identify a subset of the resource pool that is not being used; and communicate data via the subset of the resource pool, wherein the data is communicated using the second RAT.

Another aspect of the disclosure provides a method of communication including: determining, from a device-to-device communication resource pool allocated for a first radio access technology (RAT), a percentage of the resource pool that is being used for communication using the first RAT; comparing the percentage to a threshold; determining, based on the comparison, to use the resource pool for communication using a second RAT; identifying a subset of the resource pool that is not being used; and communicating data via the subset of the resource pool, wherein the data is communicated using the second RAT.

Another aspect of the disclosure provides an apparatus configured for communication. The apparatus including: means for determining, from a device-to-device communication resource pool allocated for a first radio access technology (RAT), a percentage of the resource pool that is being used for communication using the first RAT; means for comparing the percentage to a threshold; means for determining, based on the comparison, to use the resource pool for communication using a second RAT; means for identifying a subset of the resource pool that is not being used; and means for communicating data via the subset of the resource pool, wherein the data is communicated using the second RAT.

Another aspect of the disclosure provides a non-transitory computer-readable medium storing computer-executable code, including code to: determine, from a device-to-device communication resource pool allocated for a first radio access technology (RAT), a percentage of the resource pool that is being used for communication using the first RAT; compare the percentage to a threshold; determine, based on the comparison, to use the resource pool for communication using a second RAT; identify a subset of the resource pool that is not being used; and communicate data via the subset of the resource pool, wherein the data is communicated using the second RAT.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
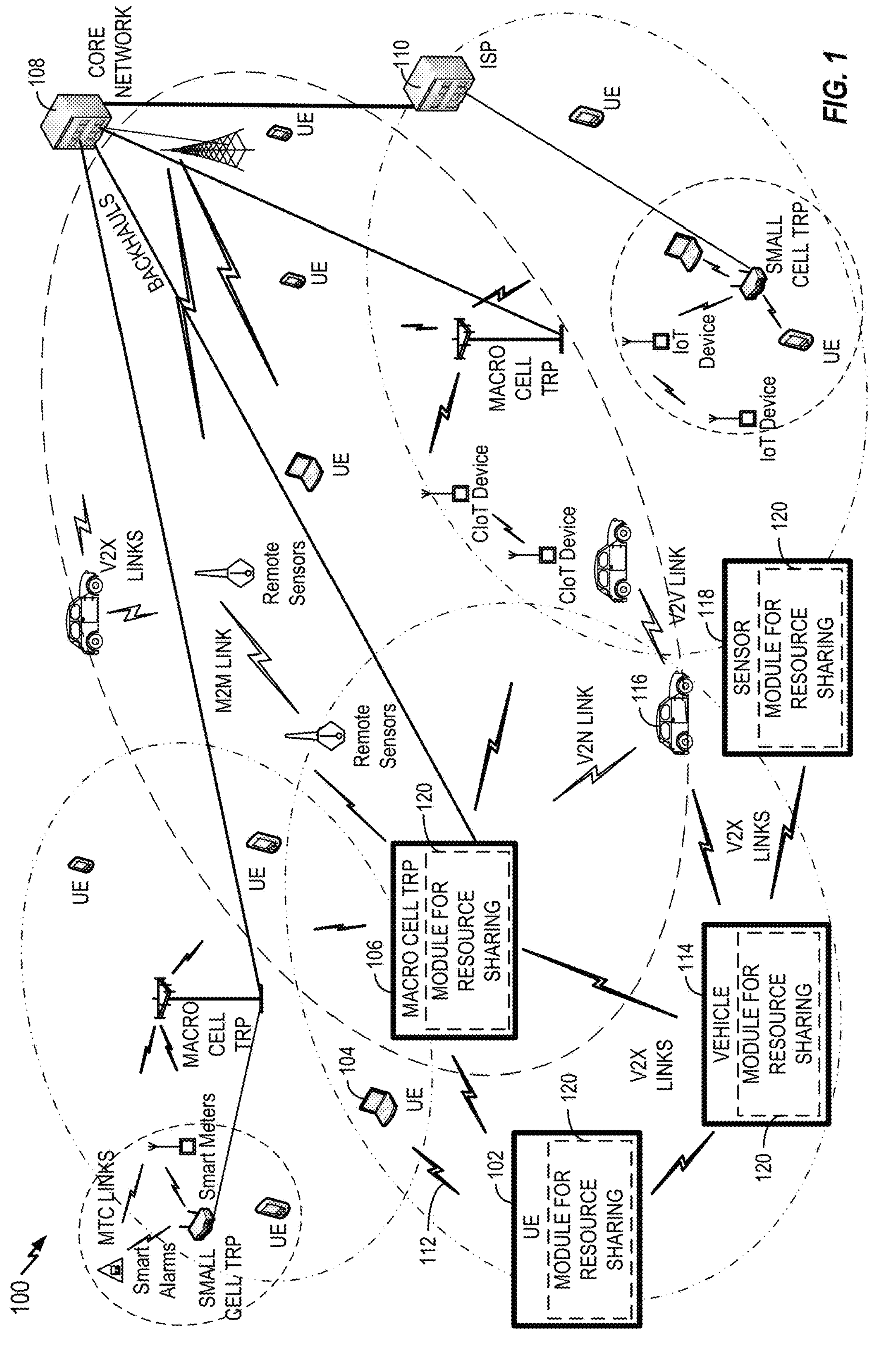
FIG. 1 illustrates an example communication system within which aspects of the disclosure may be implemented.

The disclosure relates in some aspects to dynamically sharing wireless communication resources. For example, a first type of device allocated to use a first resource pool may dynamically use a second resource pool allocated for a second type of device. The first type of device may use an entry criteria to determine whether to use the second resource pool. In some aspects, the entry criteria may specify that resource sharing is permitted if a ratio of resources used by devices of the second type (relative to the total resources in the second resource pool) is less than a threshold. In addition, the first type of device may use an exit criteria to determine whether to stop using the second resource pool. In some aspects, the exit criteria may specify that resource sharing should stop if a ratio of resources used by devices of the second type (relative to the total resources in the second resource pool) is greater than a threshold. In some aspects, a device of the first type may use a reserved bit of a scheduling assignment (SA) to indicate that an associated data transmission is from a device of the first type. Thus, through the use of this bit, the first type of device can determine whether an SA transmitted in the second resource pool is associated with a transmission by the first type of device or the second type of device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system, an LTE system, a V2X system, or a combination thereof. It should be appreciated, however, that the teachings herein may be used in other systems as well. Thus, references to functionality in the context of 5G terminology, LTE terminology, V2X terminology, or a combination thereof, should be understood to be equally applicable to other types of technology, networks, components, signaling, and so on. 5G may be referred to herein as New Radio (NR).

Example Communication System

FIG. 1 illustrates an example of a wireless communication system 100 where a user equipment (UE), a vehicle, or some other type of device can communicate with other devices via wireless communication signaling. For example, a first UE 102 and a second UE 104 may communicate with a transmit receive point (TRP) 106 using wireless communication resources managed by the TRP 106 and/or other network devices (e.g., a core network 108, an internet service provider (ISP) 110, peer devices, and so on).

In some cases, devices of the system 100 may communicate with each other directly via a direct link 112 (e.g., a unicast link, a broadcast link, or a multicast link). A direct link may take the form of, for example, a vehicle-to-anything (V2X) link or a device-to-device (D2D) link. As shown in FIG. 1, a first vehicle 114 may communicate via V2X communication (or via a similar form of communication such as a vehicle-to-vehicle (V2V) communication or vehicle-to-network (V2N) communication) with a second vehicle 116, the UE 102, a sensor 118, the TRP 106, or some other device (e.g., component) of the system 100.

In accordance with the teachings herein, devices of the system 100 may include functionality for sharing a wireless communication resource. For example, each of the first vehicle 114, the UE 102, the sensor 118, the TRP 106, or any other component of the system 100, may include a module for resource sharing 120.

The devices and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of links may be supported in the wireless communication system 100. For example, D2D links may include, without limitation, machine-to-machine (M2M) links, MTC links, V2V links, and V2X links. Network-to-device links may include, without limitation, uplinks (or reverse links), downlinks (or forward links), V2N links, and V2X links. Broadcast links may include, without limitation, V2V links, V2X links, M2M links, and MTC links. In some aspects, V2V and V2N communication may be considered as examples of V2X communication.

Vehicle-to-Everything Communication

Later releases of the LTE specification standardize Vehicle-to-Everything (V2X) communication. For example, Rel-14 defines LTE-based V2X using a sidelink and a Uu interface. As part of 5G, a New Radio (NR) V2X sidelink may have enhanced capabilities. In some scenarios, LTE V2X and NR V2X can operate in different frequency spectrums. However, it is possible that LTE V2X and NR V2X may share one frequency (e.g., share a frequency band). One way to allow this sharing is to configure one transmission resource pool of an allocated frequency band for LTE V2X and another resource pool of the allocated frequency band for NR V2X. However, this semi-static resource partitioning can lead to inefficient resource utilization. For example, if the resource pools are the same size, inefficient resource utilization can occur if there are more NR V2X devices (e.g., user equipment, UEs) using the NR V2X resource pool than there are LTE V2X UEs using the LTE V2X resource pool.

Dynamic Resource Sharing

Figure 2:
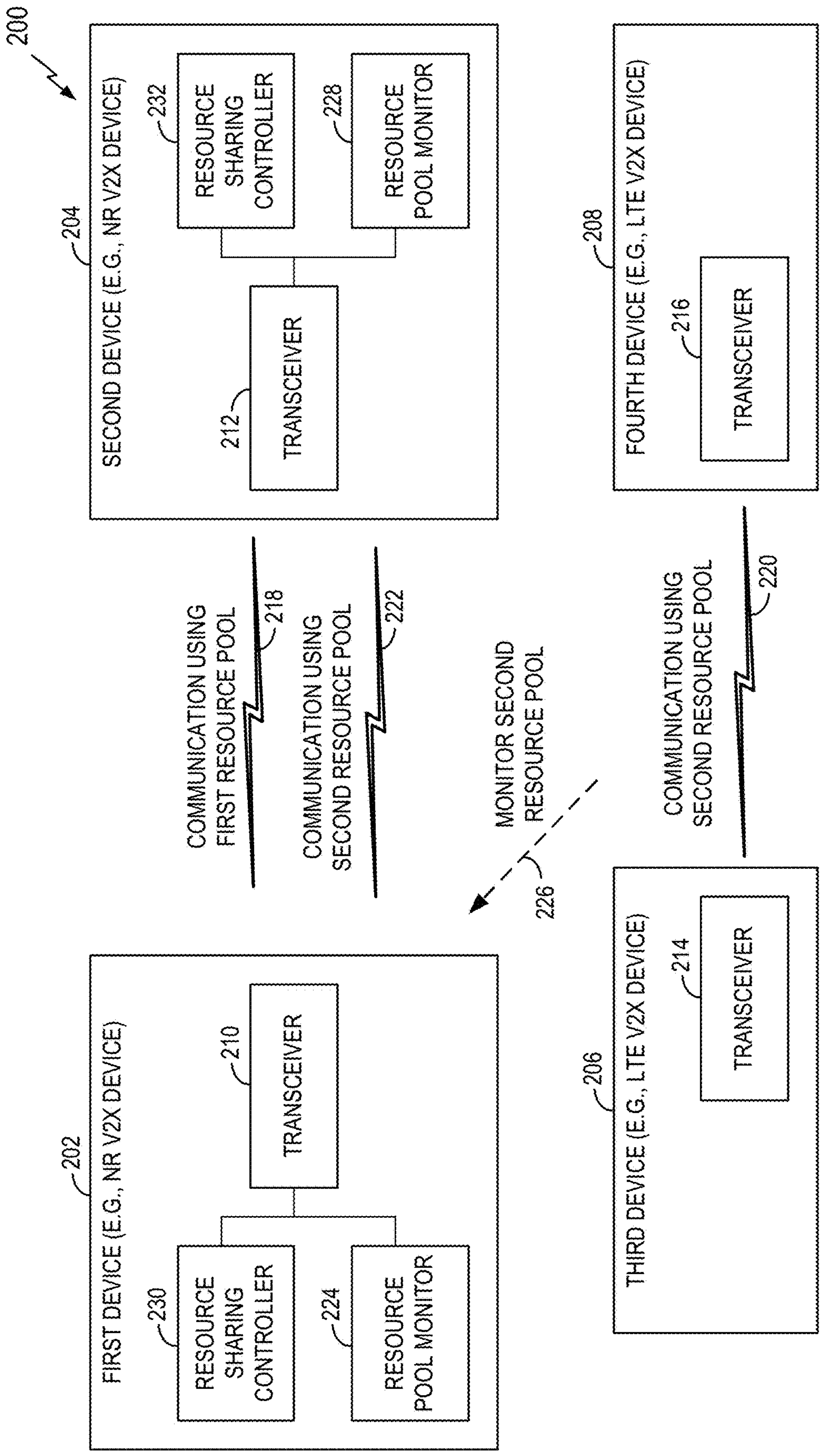
FIG. 2 is a block diagram illustrates an example of resource sharing in accordance with some aspects of the disclosure.

The disclosure relates in some aspects to dynamic spectrum sharing between LTE V2X and NR V2X for better resource utilization. FIG. 2 illustrates an example of a communication system 200 that supports resource sharing in accordance with the teachings herein. The communication system 200 includes a first device 202 (e.g., an NR V2X device) that communicates with a second device 204 (e.g., an NR V2X device) via wireless communication. The communication system 200 also includes a third device 206 (e.g., an LTE V2X device) that communicates with a fourth device 208 (e.g., an LTE V2X device) via wireless communication.

Typically, the communication system 200 will include other wireless communication devices (e.g., base stations, UEs, and other V2X-capable devices). To reduce the complexity of FIG. 2, however, only the first device 202, the second device 204, the third device 206, and the fourth device 208 are shown. The first device 202 and/or the second device 204 may correspond to, for example, the first vehicle 114, the second vehicle 116, the UE 102, a sensor 118, the TRP 106, or some other device of the system 100 of FIG. 1.

The first device 202, the second device 204, the third device 206, and the fourth device 208 include respective RF transceivers 210, 212, 214, and 216 (e.g., including PHY and MAC functionality) for communicating via allocated wireless communication resource pools. In this example, a first resource pool is allocated for NR V2X communication, while a second resource pool is allocated for LTE V2X communication. Thus, the first device 202 and the second device 204 can communicate 218 via the first resource pool and the third device 206 and the fourth device 208 can communicate 220 via the second resource pool.

In accordance with the teachings herein, the first device 202 and the second device 204 can dynamically communicate 222 via the second resource pool as long as the designated entry criteria is satisfied. For purposes of explanation, the following describes an example where the first device 202 wishes to transmit to the second device 204 using the second resource.

The first device 202 includes a resource pool monitor 224 that can monitor 226 traffic on the second resource pool. For example, as discussed below, the first device 202 can receive and decode scheduling assignments sent over the second resource pool to schedule frequency resources (e.g., physical radio blocks (PRBs) and/or sub-channels) that are currently being used for LTE V2X communication. The second device 202 includes a resource pool monitor 228 that has functionality similar to the resource pool monitor 224.

The first device 202 also includes a resource sharing controller 230 that can determine whether the second resource pool is being underutilized by the LTE V2X devices (e.g., the third device 206 and the fourth device 208). As discussed in more detail below, in some implementations, this may involve determining a channel busy ratio (CBR) based on the LTE V2X traffic on the second resource pool and comparing the CBR to a designated threshold. If the second resource pool is currently being underutilized (e.g., the CBR is less than the threshold), the first device 202 and the second device 204 can use the second resource pool for their V2X communication. The second device 202 includes a resource sharing controller 232 that has functionality similar to the resource sharing controller 230.

The first device 202 can continue to monitor 226 the second resource pool to determine whether use of the second resource pool by the LTE V2X devices has increased. For example, if the CBR subsequently rises above the designated threshold, the first device 202 and the second device 204 may stop using the second resource pool for their V2X communication.

Example V2X Resource Sharing

Example details of resource sharing for V2X traffic will now be described. It should be appreciated that the teachings herein could be applicable to other types of traffic. In some aspects, this resource sharing could be supported by the components of FIGS. 1 and 2.

For purposes of explanation, it is assumed that LTE V2X UEs can only understand LTE V2X signaling, whereas NR V2X-capable UEs can understand both NR V2X signaling and LTE V2X signaling.

For each LTE V2X transmission pool there is one channel busy ratio (CBR) parameter configured. This parameter can be read by NR V2X UEs. For example, this parameter may be broadcast (e.g., via a system information block, SIB), sent via dedicated signaling (e.g., Radio Resource Control (RRC) message), or pre-configuration into a device.

The NR V2X UEs can also read the LTE V2X pool parameters. Thus, the NR V2X UEs may be considered as dual-capable devices.

While an NR V2X UE operates in NR mode in the NR transmission pool, the UE can listen to all traffic in LTE V2X pool as well. The NR V2X UE can thus perform CBR measurements in the LTE V2X pool for LTE V2X traffic. If the measured CBR of the LTE V2X pool (the CBR due to traffic from LTE V2X UEs) drops below the configured CBR threshold, the NR V2X UE can start utilizing the LTE V2X pool for NR V2X transmission (e.g., along with the NR V2X transmission pool).

Once the NR V2X UE makes a decision to start utilizing the LTE V2X transmission pool, the NR V2X UE first excludes those frequency resources (e.g., PRBs, sub-channels, etc.) that have been indicated as being occupied by LTE V2X UEs. For example, the NR V2X UE may read the SAs being transmitted by the LTE V2X UEs.

In the remaining PRB/sub-channels, the NR V2X starts NR transmission by following a listen-before-talk (LBT) mechanism to share resources with other NR V2X UEs (e.g., for a configured duration of time). In some implementations, a few of the free PRB/subchannels may be used for a guard gap.

In some aspects, the configured duration can be represented in the form of a time period or a bit map of subframes which can be used by NR V2X UEs in the above mentioned manner once the NR V2X UE decides to start using the LTE resource pool.

In some implementations, there can be different CBR thresholds configured and, for each CBR threshold, there can be a corresponding time period/usage bit map. Different CBR thresholds can also be associated with different priority traffic.

In some implementations, the NR V2X UE can exclude all of those subframes where the UE detects an LTE V2X transmission based on a decoded SA.

While using the LTE V2X pool, the NR V2X UE can continue measuring CBR generated by LTE UEs. In the event the CBR due to the LTE UEs goes above the configured CBR threshold, the NR V2X UE may stop using the LTE V2X resource pool.

It should be noted that when an NR V2X UE operates in some of the PRBs/sub-channels of the LTE V2X resource pool, an LTE V2X UE using the pool will “see” energy on those resources. In this case, following the Rel-14 sensing mechanism, the LTE V2X UE will avoid those resources as much as possible for resource reselection.

The NR V2X UE tries to decode LTE V2X traffic in the LTE resource pool as well as NR V2X traffic in LTE V2X pool. To reduce NR V2X UE receiver complexity, the NR V2X UE may first check for an LBT sequence transmitted by any NR V2X transmitters to identify the frequency resources of the LTE pool in which NR V2X transmission is being performed.

In some implementations, when the NR V2X UE decides to start utilizing the LTE V2X resource pool, the NR V2X UE considers the NR V2X resource pool and available PRBs/subchannels of the LTE resource pool as one joint pool. In this case, the NR V2X UE may perform LBT and SA/data transmission in the joint pool. Thus, improvements in performance may be achieved since better modulation and coding may be used and/or since overhead may be reduced.

In some implementations, resources of the NR V2X pool and the available resources of the LTE V2X pool are considered independently for LBT and SA/data transmission.

In some implementations, when the NR V2X UE decides to use the LTE V2X pool, the NR V2X UE may transmit an LTE-based SA to reserve the resources. This may be achieved by utilizing a reserved bit in the LTE SA to indicate that the reservation is performed by an NR V2X UE. This bit can be understood by NR V2X receivers but not Rel-14 receiver (since these LTE V2X UEs don't know the meaning of this bit). By using this reserved bit, an NR V2X UE can exclude these resources for CBR calculation for LTE traffic only.

Example Process

Figure 3:
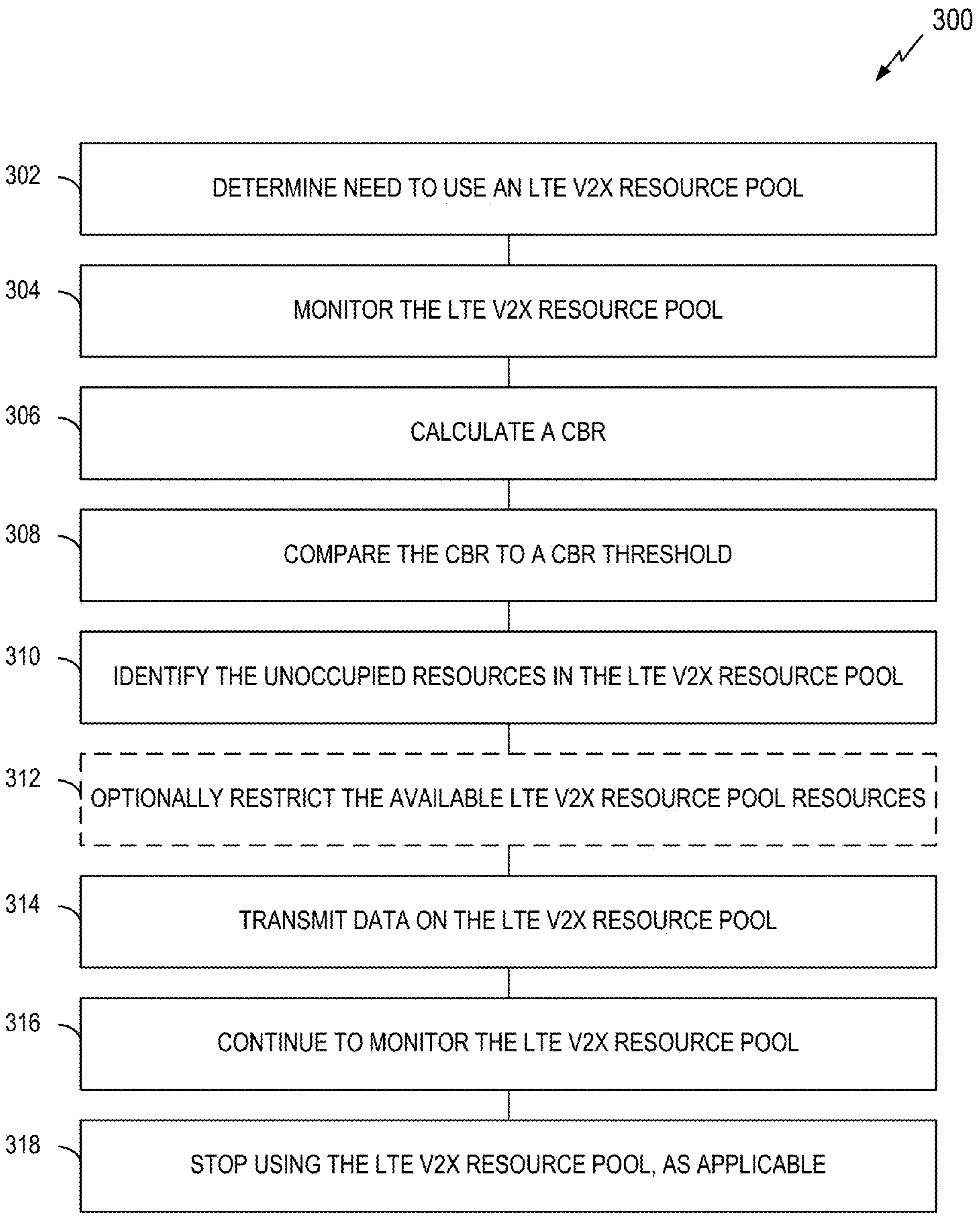
FIG. 3 is a flow diagram illustrating an example of a process for resource sharing in accordance with some aspects of the disclosure.

FIG. 3 illustrates an example resource sharing process 300 in accordance with some aspects of the disclosure. The process 300 may take place within a processing circuit (e.g., the processing circuit 410 of FIG. 4 or the processing circuit 1210 of FIG. 12), which may be located in an NR V2X device, a UE, an access terminal, or some other suitable apparatus. Of course, in various aspects within the scope of the disclosure, the process 300 may be implemented by any suitable apparatus capable of supporting communication-related operations.

At block 302, an NR V2X device determines that it needs to use an LTE V2X resource pool for its V2X communication. For example, an NR V2X device using an NR V2X resource pool may determine that it needs additional resources for V2X communication.

At block 304, the NR V2X device monitors the LTE V2X resource pool. For example, the NR V2X device may attempt to decode SAs sent in the LTE V2X resource pool.

At block 306, the NR V2X device calculates a CBR. For example, the NR V2X device may try to decode LTE V2X traffic in the LTE V2X resource pool as well as NR V2X traffic in LTE V2X resource pool. In addition, the NR V2X device may first check for any LBT sequences transmitted by any NR V2X devices to identify the frequency resources of the LTE V2X resource pool being used by NR V2X devices (so these resources can be excluded from the CBR).

At block 308, the NR V2X device compares the CBR to a CBR threshold. If the CBR is greater than the CBR threshold (the LTE V2X resource pool is not underutilized), the NR V2X device may continue monitoring the LTE V2X resource pool and calculating the CBR to see if the entry criteria can be met at a later time (blocks 304 and 306) and/or the NR V2X device may determine whether it still needs the LTE V2X resource pool (block 302). Conversely, if the CBR is less than the CBR threshold (the LTE V2X resource pool is underutilized), the process proceeds to block 310.

At block 310, the NR V2X device identifies the unoccupied resources in the LTE V2X resource pool. As discussed above, the NR V2X device may check a reserved bit in the SA transmissions to determine whether the SA transmissions are by an LTE V2X device or an NR V2X device.

At optional block 312, the NR V2X device may restrict the available LTE V2X resource pool resources to be used for the NR V2X device's transmissions in the LTE V2X resource pool. For example, a specified time duration or a bit map may limit the actual resources (e.g., PRBs, subframes, etc.) that can be used by the NR V2X device. In some implementations, this restriction may depend on a priority (e.g., a traffic priority). For example, a bit map for higher priority traffic may allow the use of more resources than a bit map for lower priority traffic.

At block 314, the NR V2X device transmits data on the LTE V2X resource pool. As discussed above, this may involve use of an LBT procedure as well as sending an SA to indicate that resources are being used for NR V2X communication.

At block 316, the NR V2X device may continue to monitor the LTE V2X resource pool to determine whether it needs to stop using the LTE V2X resource pool. For example, as discussed above, the NR V2X device may calculate a new CBR and compare the new CBR to the CBR threshold.

At block 318, if the new CBR exceeds the CBR threshold (exit criteria met), the NR V2X device stops using the LTE V2X resource pool. For example, the NR V2X may stop using the LTE V2X resource pool for a configured period of time after a higher CBR is detected.

First Example Apparatus

Figure 4:
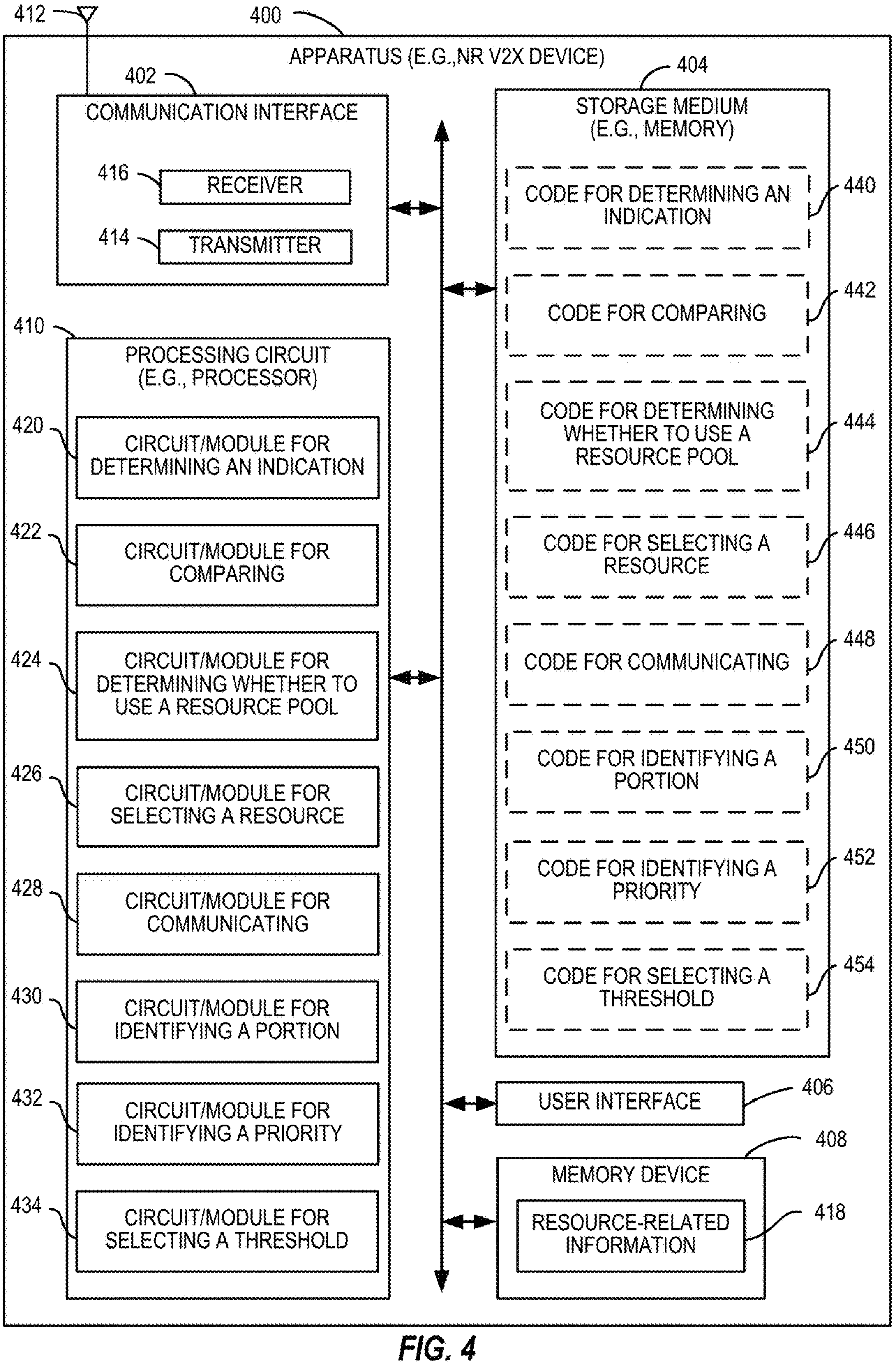
FIG. 4 is a block diagram of an example hardware implementation for an apparatus (e.g., an electronic device) that can support resource sharing in accordance with some aspects of the disclosure.

FIG. 4 is an illustration of an apparatus 400 that may support communication according to one or more aspects of the disclosure. The apparatus 400 could embody or be implemented within an NR V2X device, a UE, an access terminal, or some other suitable apparatus that supports wireless communication. In various implementations, the apparatus 400 could embody or be implemented within a scheduling entity, an access point, an access terminal, or some other type of device. In various implementations, the apparatus 400 could embody or be implemented within a mobile phone, a smart phone, a tablet, a portable computer, a server, a personal computer, a sensor, an alarm, a machine, a vehicle, an entertainment device, a medical device, or any other electronic device having circuitry.

The apparatus 400 includes a communication interface (e.g., at least one transceiver) 402, a storage medium 404, a user interface 406, a memory device (e.g., a memory circuit) 408, and a processing circuit 410 (e.g., at least one processor). In various implementations, the user interface 406 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 4. The signaling bus may include any number of interconnecting buses and bridges depending on the specific application of the processing circuit 410 and the overall design constraints. The signaling bus links together various circuits such that each of the communication interface 402, the storage medium 404, the user interface 406, and the memory device 408 are coupled to and/or in electrical communication with the processing circuit 410. The signaling bus may also link various other circuits (not shown) such as timing sources, peripherals, voltage regulators, and power management circuits, which are well known in the art, and therefore, will not be described any further.

The communication interface 402 provides a means for communicating with other apparatuses over a transmission medium. In some implementations, the communication interface 402 includes circuitry and/or programming adapted to facilitate the communication of information bi-directionally with respect to one or more communication devices in a network. In some implementations, the communication interface 402 is adapted to facilitate wireless communication of the apparatus 400. In these implementations, the communication interface 402 may be coupled to one or more antennas 412 as shown in FIG. 4 for wireless communication within a wireless communication system. In some implementations, the communication interface 402 may be configured for wire-based communication. For example, the communication interface 402 could be a bus interface, a send/receive interface, or some other type of signal interface including drivers, buffers, or other circuitry for outputting and/or obtaining signals (e.g., outputting signal from and/or receiving signals into an integrated circuit). The communication interface 402 can be configured with one or more standalone receivers and/or transmitters, as well as one or more transceivers. In the illustrated example, the communication interface 402 includes a transmitter 414 and a receiver 416. The communication interface 402 serves as one example of a means for receiving and/or means transmitting.

The memory device 408 may represent one or more memory devices. As indicated, the memory device 408 may maintain resource-related information 418 along with other information used by the apparatus 400. In some implementations, the memory device 408 and the storage medium 404 are implemented as a common memory component. The memory device 408 may also be used for storing data that is manipulated by the processing circuit 410 or some other component of the apparatus 400.

The storage medium 404 may represent one or more computer-readable, machine-readable, and/or processor-readable devices for storing programming, such as processor executable code or instructions (e.g., software, firmware), electronic data, databases, or other digital information. The storage medium 404 may also be used for storing data that is manipulated by the processing circuit 410 when executing programming. The storage medium 404 may be any available media that can be accessed by a general purpose or special purpose processor, including portable or fixed storage devices, optical storage devices, and various other mediums capable of storing, containing or carrying programming.

By way of example and not limitation, the storage medium 404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 404 may be embodied in an article of manufacture (e.g., a computer program product). By way of example, a computer program product may include a computer-readable medium in packaging materials. In view of the above, in some implementations, the storage medium 404 may be a non-transitory (e.g., tangible) storage medium.

The storage medium 404 may be coupled to the processing circuit 410 such that the processing circuit 410 can read information from, and write information to, the storage medium 404. That is, the storage medium 404 can be coupled to the processing circuit 410 so that the storage medium 404 is at least accessible by the processing circuit 410, including examples where at least one storage medium is integral to the processing circuit 410 and/or examples where at least one storage medium is separate from the processing circuit 410 (e.g., resident in the apparatus 400, external to the apparatus 400, distributed across multiple entities, etc.).

Programming stored by the storage medium 404, when executed by the processing circuit 410, causes the processing circuit 410 to perform one or more of the various functions and/or process operations described herein. For example, the storage medium 404 may include operations configured for regulating operations at one or more hardware blocks of the processing circuit 410, as well as to utilize the communication interface 402 for wireless communication utilizing their respective communication protocols. In some aspects, the storage medium 404 may be a non-transitory computer-readable medium storing computer-executable code, including code to perform operations as described herein.

The processing circuit 410 is generally adapted for processing, including the execution of such programming stored on the storage medium 404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 410 is arranged to obtain, process and/or send data, control data access and storage, issue commands, and control other desired operations. The processing circuit 410 may include circuitry configured to implement desired programming provided by appropriate media in at least one example. For example, the processing circuit 410 may be implemented as one or more processors, one or more controllers, and/or other structure configured to execute executable programming Examples of the processing circuit 410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 410 are for illustration and other suitable configurations within the scope of the disclosure are also contemplated.

According to one or more aspects of the disclosure, the processing circuit 410 may be adapted to perform any or all of the features, processes, functions, operations and/or routines for any or all of the apparatuses described herein. For example, the processing circuit 410 may be configured to perform any of the steps, functions, and/or processes described herein with respect to FIGS. 1-3 and 5-11 in various implementations. As used herein, the term "adapted" in relation to the processing circuit 410 may refer to the processing circuit 410 being one or more of configured, employed, implemented, and/or programmed to perform a particular process, function, operation and/or routine according to various features described herein.

The processing circuit 410 may be a specialized processor, such as an application specific integrated circuit (ASIC) that serves as a means for (e.g., structure for) carrying out any one of the operations described herein in conjunction with FIGS. 1-3 and 5-11 in various implementations. The processing circuit 410 may serve as one example of a means for transmitting and/or a means for receiving. In various implementations, the processing circuit 410 may provide and/or incorporate, at least in part, the functionality described above for the first device 202 (e.g., the resource sharing controller 230 and/or the resource pool monitor 224) of FIG. 2.

According to at least one example of the apparatus 400, the processing circuit 410 may include one or more of a circuit/module for determining an indication 420, a circuit/module for comparing 422, a circuit/module for determining whether to use a resource pool 424, a circuit/module for selecting a resource 426, a circuit/module for communicating 428, a circuit/module for identifying a portion 430, a circuit/module for identifying a priority 432, or a circuit/module for selecting a threshold 434. In various implementations, the circuit/module for determining an indication 420, the circuit/module for comparing 422, the circuit/module for determining whether to use a resource pool 424, the circuit/module for selecting a resource 426, the circuit/module for communicating 428, the circuit/module for identifying a portion 430, the circuit/module for identifying a priority 432, or the circuit/module for selecting a threshold 434 may provide and/or incorporate, at least in part, the functionality described above for the first device 202 (e.g., the resource sharing controller 230 and/or the resource pool monitor 224) of FIG. 2.

As mentioned above, programming stored by the storage medium 404, when executed by the processing circuit 410, causes the processing circuit 410 to perform one or more of the various functions and/or process operations described herein. For example, the programming, when executed by the processing circuit 410, may cause the processing circuit 410 to perform the various functions, steps, and/or processes described herein with respect to FIGS. 1-3 and 5-11 in various implementations. As shown in FIG. 4, the storage medium 404 may include one or more of code for determining an indication 440, code for comparing 442, code for determining whether to use a resource pool 444, code for selecting a resource 446, code for communicating 448, code for identifying a portion 450, code for identifying a priority 452, or code for selecting a threshold 454. In various implementations, the code for determining an indication 440, the code for comparing 442, the code for determining whether to use a resource pool 444, the code for selecting a resource 446, the code for communicating 448, the code for identifying a portion 450, the code for identifying a priority 452, or the code for selecting a threshold 454 may be executed or otherwise used to provide the functionality described herein for the circuit/module for determining an indication 420, the circuit/module for comparing 422, the circuit/module for determining whether to use a resource pool 424, the circuit/module for selecting a resource 426, the circuit/module for communicating 428, the circuit/module for identifying a portion 430, the circuit/module for identifying a priority 432, or the circuit/module for selecting a threshold 434, respectively.

The circuit/module for determining an indication 420 may include circuitry and/or programming (e.g., code for determining an indication 440 stored on the storage medium 404) adapted to perform several functions relating to, for example, determining an indication of use. In some aspects, the circuit/module for determining an indication 420 (e.g., a means for determining an indication) may correspond to, for example, a processing circuit.

Initially, the circuit/module for determining an indication 420 may obtain information upon which the determination is to be based. For example, the circuit/module for determining an indication 420 may obtain information about a D2D communication resource pool allocated for a first RAT (e.g., from the memory device 408, the circuit/module for communicating 428, or some other component of the apparatus 400). The circuit/module for determining an indication 420 may then make the determination based on the obtained information. For example, the circuit/module for determining an indication 420 may determine a percentage of the resource pool that is being used for communication using the first RAT (e.g., as discussed herein in conjunction with FIGS. 1-3, 5-11, and 13). The circuit/module for determining an indication 420 may then output the indication (e.g., to the circuit/module for comparing 422, the memory device 408, or some other component of the apparatus 400).

The circuit/module for comparing 422 may include circuitry and/or programming (e.g., code for comparing 442 stored on the storage medium 404) adapted to perform several functions relating to, for example, comparing information (e.g., two values). In some aspects, the circuit/module for comparing 422 (e.g., a means for comparing) may correspond to, for example, a processing circuit.

In one scenario, the circuit/module for comparing 422 obtains information to be compared (e.g., from the circuit/module for determining an indication 420, the memory device 408, or some other component of the apparatus 400). The circuit/module for comparing 422 the compares the information (e.g., determines which one of two values is larger by performing a subtraction operation). For example, the circuit/module for comparing 422 may compare a threshold (e.g., a CBR threshold) with an indication of use (e.g., as discussed herein in conjunction with FIGS. 1-3, 5-11, and 13). The circuit/module for comparing 422 may then output the result of this determination (e.g., to the circuit/module for determining whether to use a resource pool 424, the memory device 408, or some other component of the apparatus 400).

The circuit/module for determining whether to use a resource pool 424 may include circuitry and/or programming (e.g., code for determining whether to use a resource pool 444 stored on the storage medium 404) adapted to perform several functions relating to, for example, determining whether to use a resource pool for communication. In some aspects, the circuit/module for determining whether to use a resource pool 424 (e.g., a means for determining whether to use a resource pool) may correspond to, for example, a processing circuit.

Initially, the circuit/module for determining whether to use a resource pool 424 may obtain information upon which the determination is to be based. For example, the circuit/module for determining whether to use a resource pool 424 may obtain information about current use of a resource pool (e.g., from the circuit/module for comparing 422, the memory device 408, or some other component of the apparatus 400). As a specific example, the circuit/module for determining whether to use a resource pool 424 may obtain the results of a comparison of an indication of use with a threshold. The circuit/module for determining whether to use a resource pool 424 may then make the determination based on the obtained information. For example, the circuit/module for determining whether to use a resource pool 424 may elect to use the resource pool for a second RAT if the use of the resource pool by a first RAT is less than or equal to the threshold (e.g., as discussed herein in conjunction with FIGS. 1-3, 5-11, and 13). The circuit/module for determining whether to use a resource pool 424 may then output an indication of the determination (e.g., to the circuit/module for communicating 428, the memory device 408, or some other component of the apparatus 400).

The circuit/module for selecting a resource 426 may include circuitry and/or programming (e.g., code for selecting a resource 446 stored on the storage medium 404) adapted to perform several functions relating to, for example, selecting a resource from a resource pool. In some aspects, the circuit/module for selecting a resource 426 (e.g., a means for selecting a resource) may correspond to, for example, a processing circuit.

Initially, the circuit/module for selecting a resource 426 may obtain information upon which the selection is to be based. For example, the circuit/module for selecting a resource 426 may select a resource that is not currently scheduled for communication. Thus, the circuit/module for selecting a resource 426 may initially determine whether one or more resources are scheduled for communication (e.g., based on information from the circuit/module for determining an indication 420, the circuit/module for determining whether to use a resource pool 424, the memory device 408, or some other component of the apparatus 400). The circuit/module for selecting a resource 426 can thus determine which of these resources should be used (e.g., as discussed herein in conjunction with FIGS. 1-3, 5-11, and 13). The circuit/module for selecting a resource 426 may then output an indication of the selection (e.g., to the circuit/module for communicating 428, the memory device 408, or some other component of the apparatus 400).

The circuit/module for communicating 428 may include circuitry and/or programming (e.g., code for communicating 448 stored on the storage medium 404) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 428 may communicate data via a resource pool. In some aspects, the circuit/module for communicating 428 may communicate (e.g., receive) a scheduling assignment. In some aspects, the circuit/module for communicating 428 may communicate via a V2X sidelink.

In some implementations where the communicating involves receiving information, the circuit/module for communicating 428 receives information (e.g., from the communication interface 402, the receiver 416, the memory device 408, some other component of the apparatus 400, or some other device), processes (e.g., decodes) the information, and outputs the information to another component of the apparatus 400 (e.g., the memory device 408 or some other component). In some scenarios (e.g., if the circuit/module for communicating 428 includes a receiver), the communicating involves the circuit/module for communicating 428 receiving information directly from a device that transmitted the information (e.g., via radio frequency signaling or some other type of signaling suitable for the applicable communication medium).

In some implementations where the communicating involves sending information, the circuit/module for communicating 428 obtains information (e.g., from the memory device 408 or some other component of the apparatus 400), processes (e.g., encodes) the information, and outputs the processed information. In some scenarios, the communicating involves sending the information to another component of the apparatus 400 (e.g., the transmitter 414, the communication interface 402, or some other component) that will transmit the information to another device. In some scenarios (e.g., if the circuit/module for communicating 428 includes a transmitter), the communicating involves the circuit/module for communicating 428 transmitting the information directly to another device (e.g., the ultimate destination) via radio frequency signaling or some other type of signaling suitable for the applicable communication medium.

The circuit/module for communicating 428 (e.g., a means for communicating) may take various forms. In some aspects, the circuit/module for communicating 428 may correspond to, for example, an interface (e.g., a bus interface, a send/receive interface, or some other type of signal interface), a communication device, a transceiver, a transmitter, a receiver, or some other similar component as discussed herein. In some implementations, the communication interface 402 includes the circuit/module for communicating 428 and/or the code for communicating 448. In some implementations, the circuit/module for communicating 428 and/or the code for communicating 448 is configured to control the communication interface 402 (e.g., a transceiver, a receiver, or a transmitter) to communicate the information.

The circuit/module for identifying a portion 430 may include circuitry and/or programming (e.g., code for identifying a portion 450 stored on the storage medium 404) adapted to perform several functions relating to, for example identifying a portion of a resource. In some aspects, the circuit/module for identifying a portion 430 (e.g., a means for identifying a portion) may correspond to, for example, a processing circuit.

Initially, the circuit/module for identifying a portion 430 may obtain information upon which the identification is to be based. For example, the circuit/module for identifying a portion 430 may obtain a bit map (e.g., from the memory device 408, or some other component of the apparatus 400). In this case, the circuit/module for identifying a portion 430 may identify a portion of at least one resource based on the bit map (e.g., as discussed herein in conjunction with FIGS. 1-3, 5-11, and 13). The circuit/module for identifying a portion 430 may then output an indication of the identified portion (e.g., to the circuit/module for communicating 428, the communication interface 402, the memory device 408, or some other component of the apparatus 400).

The circuit/module for identifying a priority 432 may include circuitry and/or programming (e.g., code for identifying a priority 452 stored on the storage medium 404) adapted to perform several functions relating to, for example identifying a priority associated with data. In some aspects, the circuit/module for identifying a priority 432 (e.g., a means for identifying a priority) may correspond to, for example, a processing circuit.

Initially, the circuit/module for identifying a priority 432 may obtain information upon which the identification is to be based. For example, the circuit/module for identifying a priority 432 may obtain information about data to be communicated (e.g., from the circuit/module for communicating 428, the memory device 408, or some other component of the apparatus 400). The circuit/module for identifying a priority 432 may then determine what priority is associated with the data (e.g., as discussed herein in conjunction with FIGS. 1-3, 5-11, and 13). For example, different types of traffic may have different priorities. The circuit/module for identifying a priority 432 may then output an indication of the identified priority (e.g., to the circuit/module for selecting a threshold 434, the memory device 408, or some other component of the apparatus 400).

The circuit/module for selecting a threshold 434 may include circuitry and/or programming (e.g., code for selecting a threshold 454 stored on the storage medium 404) adapted to perform several functions relating to, for example, selecting a threshold associated with use of a resource. In some aspects, the circuit/module for selecting a threshold 434 (e.g., a means for selecting a threshold) may correspond to, for example, a processing circuit.

Initially, the circuit/module for selecting a threshold 434 may obtain information upon which the selection is to be based. For example, the circuit/module for selecting a threshold 434 may select a resource based on a priority. Thus, the circuit/module for selecting a threshold 434 may initially obtain, for a given data set, the priority associated with that data (e.g., based on information from the circuit/module for identifying a priority 432, the memory device 408, or some other component of the apparatus 400). The circuit/module for selecting a threshold 434 can thus determine which threshold should be used (e.g., as discussed herein in conjunction with FIGS. 1-3, 5-11, and 13). The circuit/module for selecting a threshold 434 may then output an indication of the selection (e.g., to the circuit/module for comparing 422, the memory device 408, or some other component of the apparatus 400).

First Example Process

Figure 5:
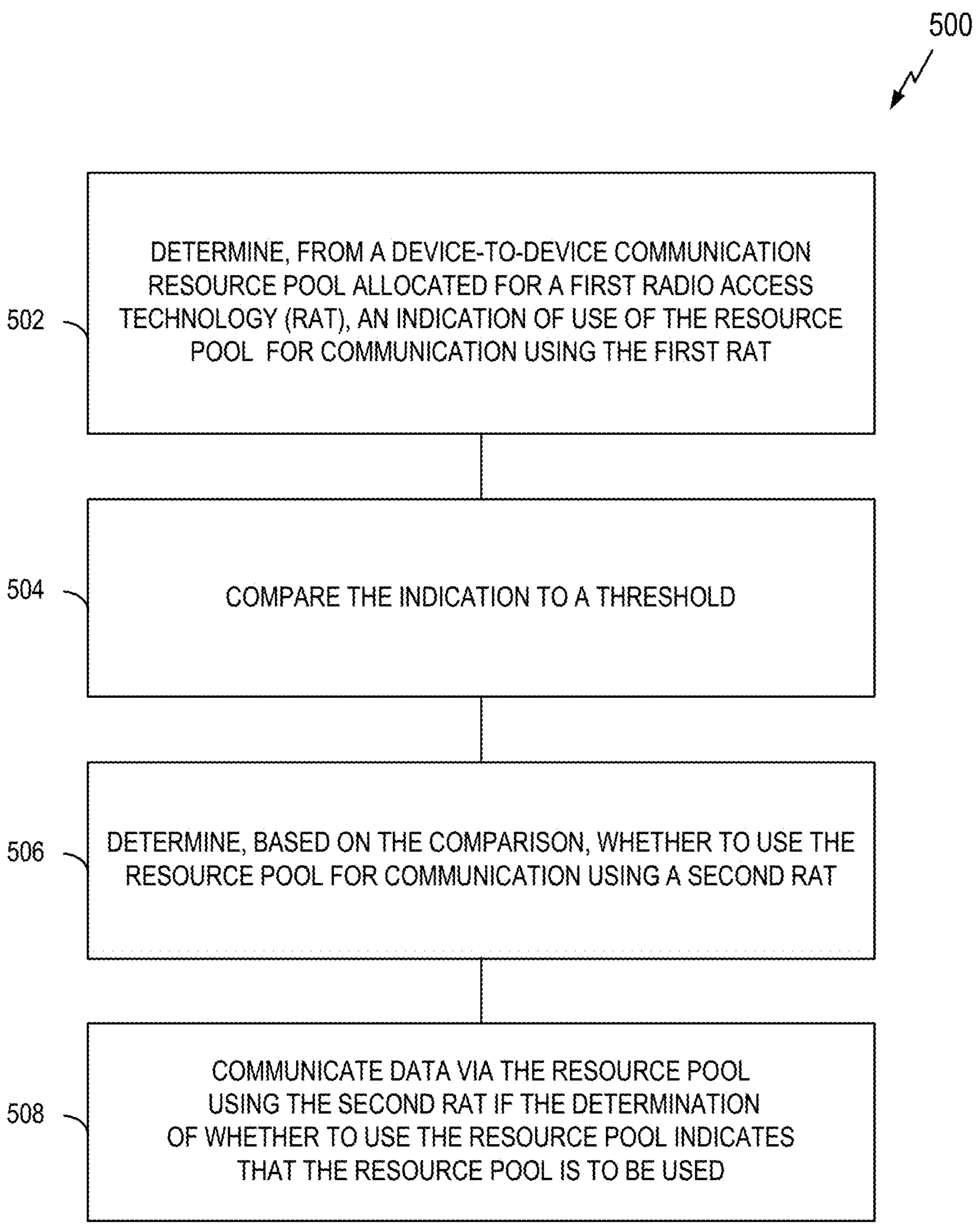
FIG. 5 is a flow diagram illustrating an example of a process for resource sharing in accordance with some aspects of the disclosure.

FIG. 5 illustrates a process 500 for communication in accordance with some aspects of the disclosure. The process 500 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 500 may be implemented by any suitable apparatus capable of supporting communication-related operations.

At block 502, an apparatus (e.g., an NR V2X device) determines, from a device-to-device communication resource pool allocated for a first radio access technology (RAT), an indication of use of the resource pool for communication using the first RAT. In some aspects, the communication using the first RAT may include Vehicle-to-Everything (V2X) sidelink communication. In some aspects, the first RAT may include 3rd Generation Partnership Project (3GPP) Long Term Evolution (LTE) technology.

In some aspects, the indication may include a percentage of the resource pool that is being used for communication using the first RAT. In some aspects, the percentage may include a channel busy ratio (CBR) that indicates occupied radio blocks relative to total allocated radio blocks.

In some aspects, the determination of the indication of use of the resource pool for communication using the first RAT may include: receiving at least one scheduling assignment including at least one bit; and identifying, based on the at least one bit, resources of the resource pool that are being used for communication using the second RAT.

In some implementations, the circuit/module for determining an indication 420 of FIG. 4 performs the operations of block 502. In some implementations, the code for determining an indication 440 of FIG. 4 is executed to perform the operations of block 502.

At block 504, the apparatus compares the indication to a threshold. In some aspects, the threshold may be a CBR threshold. In some aspects, the threshold may be one of a plurality of thresholds, where a first threshold of the plurality of thresholds is associated with a first priority and a second threshold of the plurality of thresholds is associated with a second priority.

In some implementations, the circuit/module for comparing 422 of FIG. 4 performs the operations of block 504. In some implementations, the code for comparing 442 of FIG. 4 is executed to perform the operations of block 504.

At block 506, the apparatus determines, based on the comparison of block 504, whether to use the resource pool for communication using a second RAT.

In some implementations, the circuit/module for determining whether to use a resource pool 424 of FIG. 4 performs the operations of block 506. In some implementations, the code for determining whether to use a resource pool 444 of FIG. 4 is executed to perform the operations of block 506.

At block 508, the apparatus communicates data via the resource pool using the second RAT if the determination of whether to use the resource pool at block 506 indicates that the resource pool is to be used. In some aspects, the communication using the second RAT may include Vehicle-to-Everything (V2X) sidelink communication.

In some implementations, the circuit/module for communicating 428 of FIG. 4 performs the operations of block 508. In some implementations, the code for communicating 448 of FIG. 4 is executed to perform the operations of block 508.

In some aspects, the process 500 may include identifying a portion of at least one resource based on a bit map. In this case, the data may be communicated via the identified portion of the at least one resource. In some aspects, the bit map may be one of a plurality of bit maps, where a first bit map of the plurality of bit maps is associated with a first priority and a second bit map of the plurality of bit maps is associated with a second priority.

In some aspects, the process 500 may include, after communicating the data: determining, from the resource pool, a subsequent indication of use of the resource pool for communication using the first RAT; comparing the subsequent indication to the threshold; and determining, based on the comparison of the subsequent indication to the threshold, to stop using the resource pool for the communication using the second RAT.

In some aspects, the process 500 may include any combination of the above operations.

Second Example Process

Figure 6:
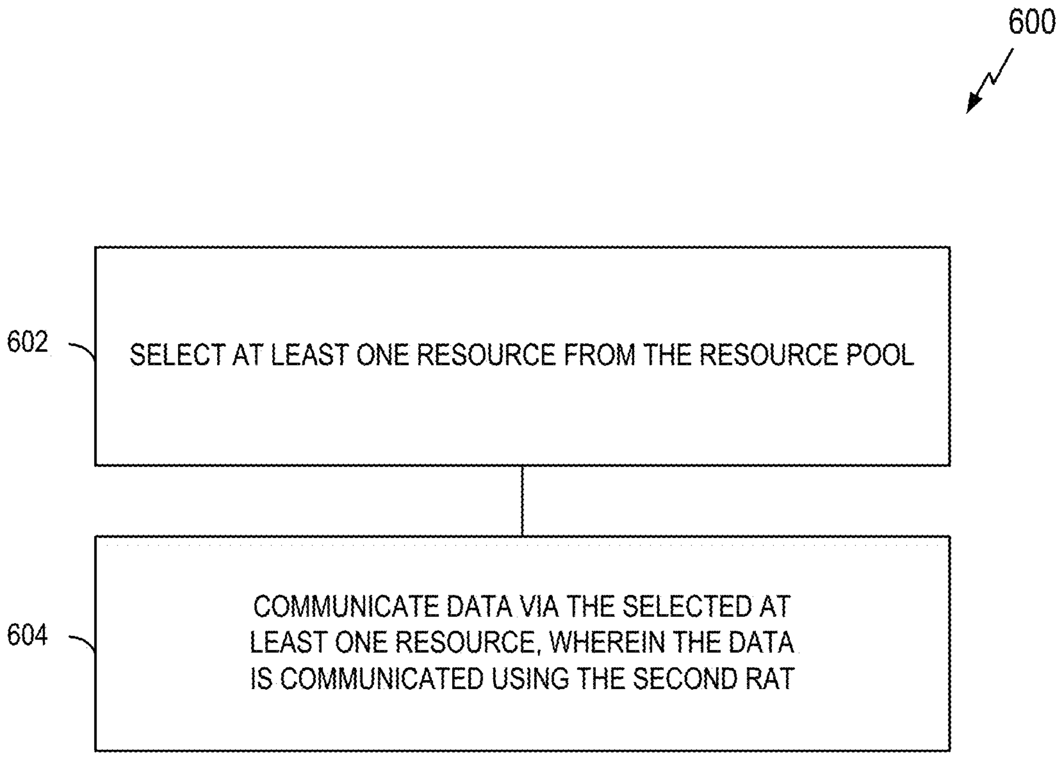
FIG. 6 is a flow diagram illustrating an example of a process for selecting a resource in accordance with some aspects of the disclosure.

FIG. 6 illustrates a process 600 for communication in accordance with some aspects of the disclosure. One or more aspects of the process 600 may be used in conjunction with (e.g., in addition to or as part of) the process 500 of FIG. 5. The process 600 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 600 may be implemented by any suitable apparatus capable of supporting communication-related operations.

At block 602, an apparatus (e.g., an NR V2X device) selects at least one resource from the resource pool. In some aspects, the selection of the at least one resource may include selecting at least one available resource from the resource pool. For example, the apparatus may select a resource that is substantially free (e.g., usage of the resource is less than or equal to a usage threshold).

In some aspects, the selection of the at least one resource may include identifying at least one resource not currently scheduled for communication. In some aspects, the identification of the at least one resource not currently scheduled for communication may include: receiving at least one scheduling assignment; and identifying, based on the at least one scheduling assignment, resources of the resource pool that are being used.

In some aspects, the process 600 may include identifying a portion of the at least one resource based on a bit map. In this case, the data may be communicated via the identified portion of the at least one resource. In some aspects, the bit map may be one of a plurality of bit maps, where a first bit map of the plurality of bit maps is associated with a first priority and a second bit map of the plurality of bit maps is associated with a second priority.

In some implementations, the circuit/module for selecting a resource 426 of FIG. 4 performs the operations of block 602. In some implementations, the code for selecting a resource 446 of FIG. 4 is executed to perform the operations of block 602.

At block 604, the apparatus communicates (e.g., sends and/or receives) data via the at least one resource. Here, the data may be communicated using the second RAT.

In some implementations, the circuit/module for communicating 428 of FIG. 4 performs the operations of block 604. In some implementations, the code for communicating 448 of FIG. 4 is executed to perform the operations of block 6-4.

In some aspects, the process 600 may include any combination of the above operations.

Third Example Process

Figure 7:
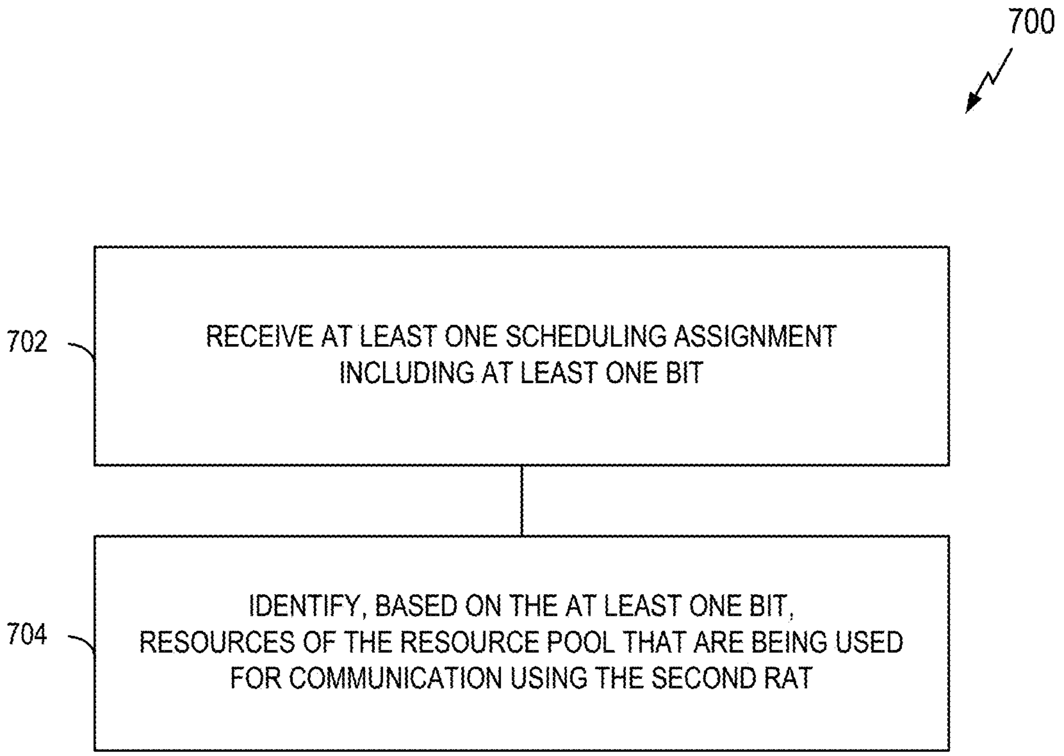
FIG. 7 is a flow diagram illustrating an example of a process for identifying a resource in accordance with some aspects of the disclosure.

FIG. 7 illustrates a process 700 for communication in accordance with some aspects of the disclosure. One or more aspects of the process 700 may be used in conjunction with (e.g., in addition to or as part of) the process 500 of FIG. 5. The process 700 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 700 may be implemented by any suitable apparatus capable of supporting communication-related operations.

At block 702, an apparatus (e.g., an NR V2X device) receives at least one scheduling assignment including at least one bit.

In some implementations, the circuit/module for communicating 428 of FIG. 4 performs the operations of block 702. In some implementations, the code for communicating 448 of FIG. 4 is executed to perform the operations of block 702.

At block 704, the apparatus identifies, based on the at least one bit, resources of the resource pool that are being used for communication using the second RAT.

In some implementations, the circuit/module for selecting a resource 426 of FIG. 4 performs the operations of block 704. In some implementations, the code for selecting a resource 446 of FIG. 4 is executed to perform the operations of block 704.

In some aspects, the process 700 may include any combination of the above operations.

Fourth Example Process

Figure 8:
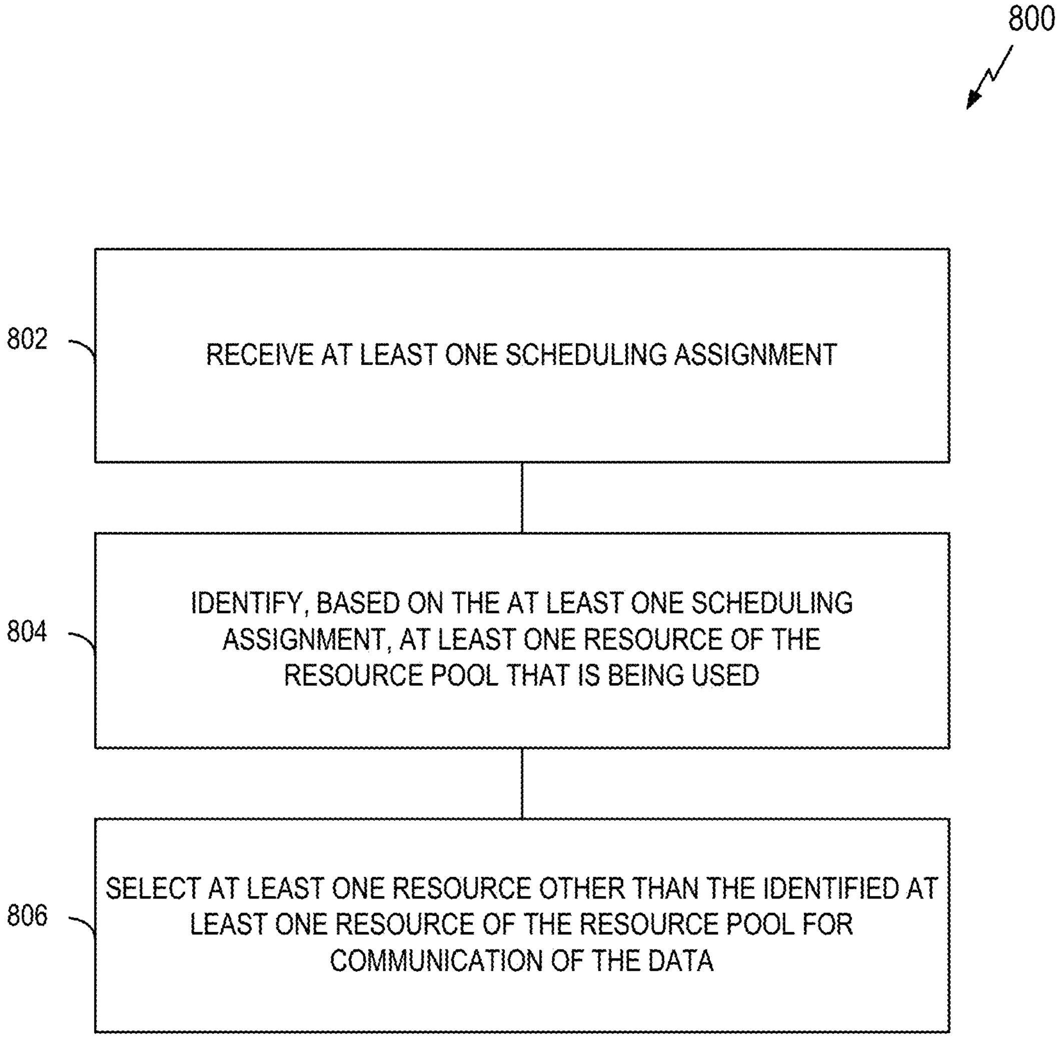
FIG. 8 is a flow diagram illustrating an example of a process for identifying a resource in accordance with some aspects of the disclosure.

FIG. 8 illustrates a process 800 for communication in accordance with some aspects of the disclosure. One or more aspects of the process 800 may be used in conjunction with (e.g., in addition to or as part of) the process 500 of FIG. 5. The process 800 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 800 may be implemented by any suitable apparatus capable of supporting communication-related operations.

At block 802, an apparatus (e.g., an NR V2X device) receives at least one scheduling assignment.

In some implementations, the circuit/module for communicating 428 of FIG. 4 performs the operations of block 802. In some implementations, the code for communicating 448 of FIG. 4 is executed to perform the operations of block 802.

At block 804, the apparatus identifies, based on the at least one scheduling assignment, at least one resource of the resource pool that are being used.

In some implementations, the circuit/module for selecting a resource 426 of FIG. 4 performs the operations of block 804. In some implementations, the code for selecting a resource 446 of FIG. 4 is executed to perform the operations of block 804.

At block 806, the apparatus selects at least one resource other than the identified at least one resource of the resource pool for communication of the data.

In some implementations, the circuit/module for selecting a resource 426 of FIG. 4 performs the operations of block 806. In some implementations, the code for selecting a resource 446 of FIG. 4 is executed to perform the operations of block 806.

In some aspects, the process 800 may include any combination of the above operations.

Fifth Example Process

Figure 9:
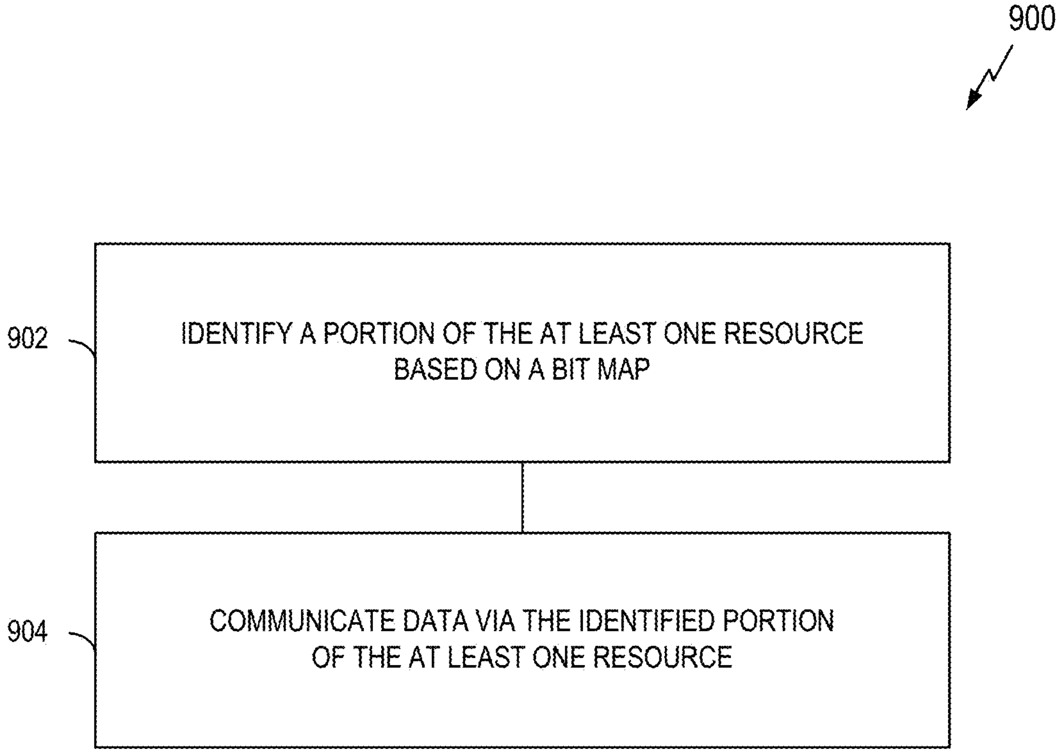
FIG. 9 is a flow diagram illustrating an example of a process for identifying a portion of a resource in accordance with some aspects of the disclosure.

FIG. 9 illustrates a process 900 for communication in accordance with some aspects of the disclosure. One or more aspects of the process 900 may be used in conjunction with (e.g., in addition to or as part of) the process 500 of FIG. 5. The process 900 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 900 may be implemented by any suitable apparatus capable of supporting communication-related operations.

At block 902, an apparatus (e.g., an NR V2X device) identifies a portion of the at least one resource based on a bit map.

In some implementations, the circuit/module for identifying a portion 430 of FIG. 4 performs the operations of block 902. In some implementations, the code for identifying a portion 450 of FIG. 4 is executed to perform the operations of block 902.

At block 904, the apparatus communicates data via the identified portion of the at least one resource.

In some implementations, the circuit/module for communicating 428 of FIG. 4 performs the operations of block 904. In some implementations, the code for communicating 448 of FIG. 4 is executed to perform the operations of block 904.

In some aspects, the process 900 may include any combination of the above operations.

Sixth Example Process

Figure 10:
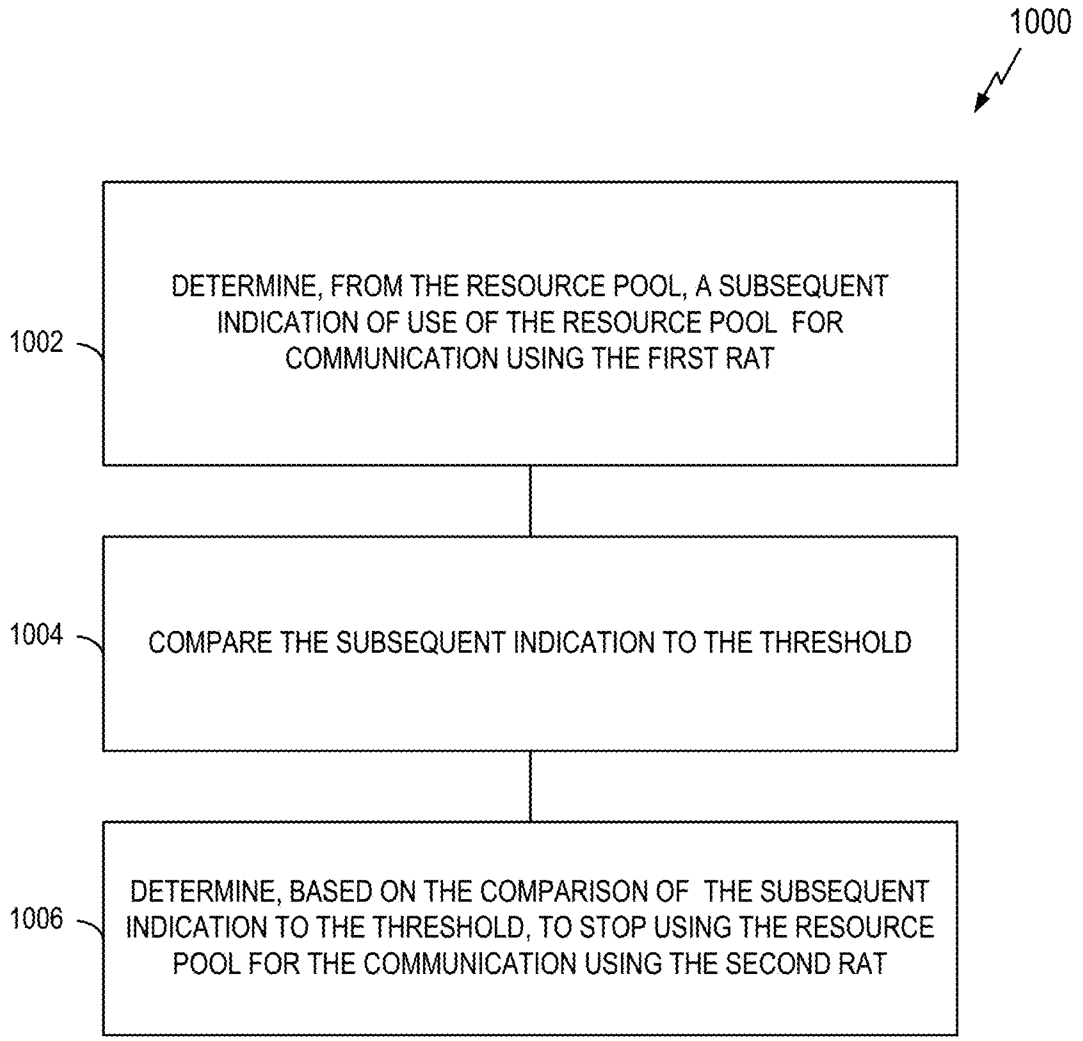
FIG. 10 is a flow diagram illustrating an example of a process for terminating use of a resource in accordance with some aspects of the disclosure.

FIG. 10 illustrates a process 1000 for communication in accordance with some aspects of the disclosure. One or more aspects of the process 1000 may be used in conjunction with (e.g., in addition to or as part of) the process 500 of FIG. 5. The process 1000 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 1000 may be implemented by any suitable apparatus capable of supporting communication-related operations.

At block 1002, an apparatus (e.g., an NR V2X device) determines, from the resource pool, a subsequent indication of use of the resource pool for communication using the first RAT.

In some implementations, the circuit/module for determining an indication 420 of FIG. 4 performs the operations of block 1002. In some implementations, the code for determining an indication 440 of FIG. 4 is executed to perform the operations of block 1002.

At block 1004, the apparatus compares the subsequent indication to the threshold.

In some implementations, the circuit/module for comparing 422 of FIG. 4 performs the operations of block 1004. In some implementations, the code for comparing 442 of FIG. 4 is executed to perform the operations of block 1004.

At block 1006, the apparatus determines, based on the comparison of the subsequent indication to the threshold, to stop using the resource pool for the communication using the second RAT.

In some implementations, the circuit/module for determining whether to use a resource pool 424 of FIG. 4 performs the operations of block 1006. In some implementations, the code for determining whether to use a resource pool 444 of FIG. 4 is executed to perform the operations of block 1006.

In some aspects, the process 1000 may include any combination of the above operations.

Seventh Example Process

Figure 11:
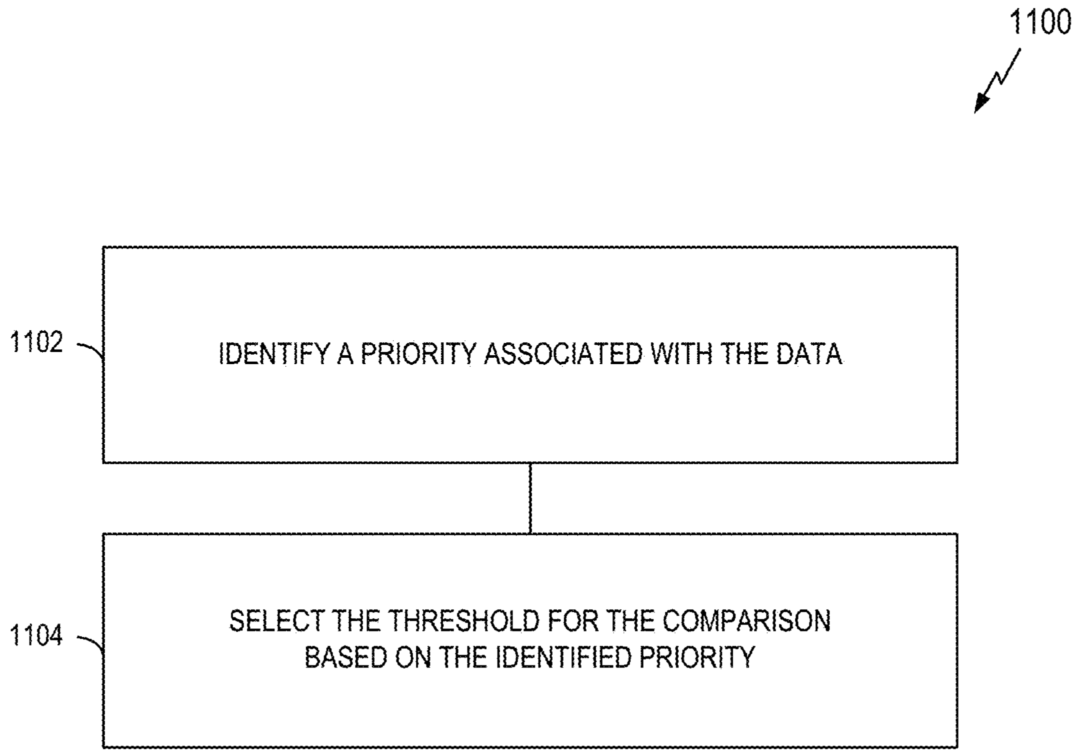
FIG. 11 is a flow diagram illustrating an example of a process for selecting a threshold in accordance with some aspects of the disclosure.

FIG. 11 illustrates a process 1100 for communication in accordance with some aspects of the disclosure. One or more aspects of the process 1100 may be used in conjunction with (e.g., in addition to or as part of) the process 500 of FIG. 5. The process 1100 may take place within a processing circuit (e.g., the processing circuit 410 of FIG. 4), which may be located in an NR V2X device, a UE, an access terminal, or some other suitable apparatus. Of course, in various aspects within the scope of the disclosure, the process 1100 may be implemented by any suitable apparatus capable of supporting communication-related operations.

At block 1102, an apparatus (e.g., an NR V2X device) identifies a priority associated with the data. For example, an NR V2X device may determine whether the data is associated with a first priority or a second priority.

In some implementations, the circuit/module for identifying a priority 432 of FIG. 4 performs the operations of block 1102. In some implementations, the code for identifying a priority 452 of FIG. 4 is executed to perform the operations of block 1102.

At block 1104, the apparatus selects the threshold for the comparison based on the identified priority. For example, an NR V2X device may select a first threshold or a second threshold for the comparison of block 504 based on whether the data is associated with the first priority or the second priority.

In some implementations, the circuit/module for selecting a threshold 434 of FIG. 4 performs the operations of block 1104. In some implementations, the code for selecting a threshold 454 of FIG. 4 is executed to perform the operations of block 1104.

In some aspects, the process 1100 may include any combination of the above operations.

Second Example Apparatus

Figure 12:
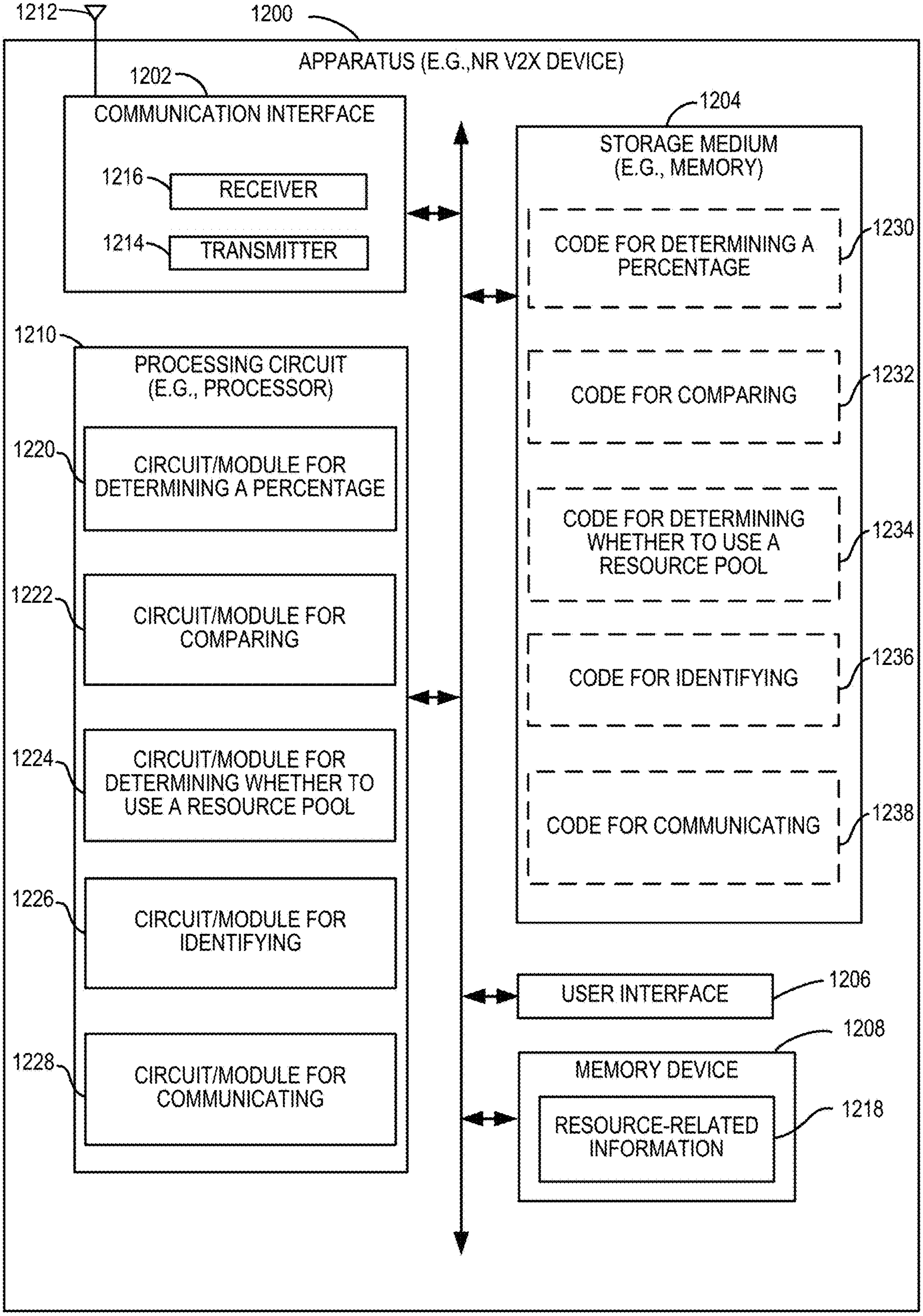
FIG. 12 is a block diagram of an example hardware implementation for an apparatus (e.g., an electronic device) that can support resource sharing in accordance with some aspects of the disclosure.

FIG. 12 is an illustration of an apparatus 1200 that may support communication according to one or more aspects of the disclosure. The apparatus 1200 could embody or be implemented within an NR V2X device, a UE, an access terminal, or some other suitable apparatus that supports wireless communication. In various implementations, the apparatus 1200 could embody or be implemented within a scheduling entity, an access point, an access terminal, or some other type of device. In various implementations, the apparatus 1200 could embody or be implemented within a mobile phone, a smart phone, a tablet, a portable computer, a server, a personal computer, a sensor, an alarm, a machine, a vehicle, an entertainment device, a medical device, or any other electronic device having circuitry.

The apparatus 1200 includes a communication interface (e.g., at least one transceiver) 1202, a storage medium 1204, a user interface 1206, a memory device 1208 (e.g., storing resource-related information 1218), and a processing circuit 1210 (e.g., at least one processor). In various implementations, the user interface 1206 may include one or more of: a keypad, a display, a speaker, a microphone, a touchscreen display, of some other circuitry for receiving an input from or sending an output to a user. The communication interface 1202 may be coupled to one or more antennas 1212, and may include a transmitter 1214 and a receiver 1216. In general, the components of FIG. 12 may be similar to corresponding components of the apparatus 400 of FIG. 4.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described herein with respect to FIGS. 1-3 and 13 in various implementations. As used herein, the term "adapted" in relation to the processing circuit 1210 may refer to the processing circuit 1210 being one or more of configured, employed, implemented, and/or programmed to perform a particular process, function, operation and/or routine according to various features described herein.

The processing circuit 1210 may be a specialized processor, such as an application specific integrated circuit (ASIC) that serves as a means for (e.g., structure for) carrying out any one of the operations described herein in conjunction with FIGS. 1-3 and 13 in various implementations. The processing circuit 1210 may serve as one example of a means for transmitting and/or a means for receiving. In various implementations, the processing circuit 1210 may provide and/or incorporate, at least in part, the functionality described above for the first device 202 (e.g., the resource sharing controller 230 and/or the resource pool monitor 224) of FIG. 2.

According to at least one example of the apparatus 1200, the processing circuit 1210 may include one or more of a circuit/module for determining a percentage 1220, a circuit/module for comparing 1222, a circuit/module for determining whether to use a resource pool 1224, a circuit/module for identifying 1226, or a circuit/module for communicating 1228. In various implementations, the circuit/module for determining a percentage 1220, the circuit/module for comparing 1222, the circuit/module for determining whether to use a resource pool 1224, the circuit/module for identifying

1226, or the circuit/module for communicating 1228 may provide and/or incorporate, at least in part, the functionality described above for the first device 202 (e.g., the resource sharing controller 230 and/or the resource pool monitor 224) of FIG. 2.

As mentioned above, programming stored by the storage medium 1204, when executed by the processing circuit 1210, causes the processing circuit 1210 to perform one or more of the various functions and/or process operations described herein. For example, the programming, when executed by the processing circuit 1210, may cause the processing circuit 1210 to perform the various functions, steps, and/or processes described herein with respect to FIGS. 1-3 and 13 in various implementations. As shown in FIG. 12, the storage medium 1204 may include one or more of code for determining a percentage 1230, code for comparing 1232, code for determining whether to use a resource pool 1234, code for identifying 1236, or code for communicating 1238. In various implementations, the code for determining a percentage 1230, the code for comparing 1232, the code for determining whether to use a resource pool 1234, the code for identifying 1236, or the code for communicating 1238 may be executed or otherwise used to provide the functionality described herein for the circuit/module for determining a percentage 1220, the circuit/module for comparing 1222, the circuit/module for determining whether to use a resource pool 1224, the circuit/module for identifying 1226, or the circuit/module for communicating 1228, respectively.

The circuit/module for determining a percentage 1220 may include circuitry and/or programming (e.g., code for determining a percentage 1230 stored on the storage medium 1204) adapted to perform several functions relating to, for example, determining a usage percentage. In some aspects, the circuit/module for determining a percentage 1220 (e.g., a means for determining a percentage) may correspond to, for example, a processing circuit.

Initially, the circuit/module for determining a percentage 1220 may obtain information upon which the determination is to be based. For example, the circuit/module for determining a percentage 1220 may obtain information about a resource pool that is being used for communication using a first RAT (e.g., from the memory device 1208, the circuit/module for communicating 1228, or some other component of the apparatus 1200). The circuit/module for determining a percentage 1220 may then make the determination based on the obtained information. For example, the circuit/module for determining a percentage 1220 may determine a percentage of the resource pool that is being used for communication using the first RAT (e.g., as discussed herein in conjunction with FIGS. 1-3, 5-11, and 13). The circuit/module for determining a percentage 1220 may then output the indication (e.g., to the circuit/module for comparing 1222, the memory device 1208, or some other component of the apparatus 1200).

The circuit/module for comparing 1222 may include circuitry and/or programming (e.g., code for comparing 1232 stored on the storage medium 1204) adapted to perform several functions relating to, for example, comparing information (e.g., two values). In some aspects, the circuit/module for comparing 1222 (e.g., a means for comparing) may correspond to, for example, a processing circuit.

In one scenario, the circuit/module for comparing 1222 obtains information to be compared (e.g., from the circuit/module for determining a percentage 1220, the memory device 1208, or some other component of the apparatus 1200). The circuit/module for comparing 1222 the compares the information (e.g., determines which one of two values is larger by performing a subtraction operation). For example, the circuit/module for comparing 1222 may compare a threshold (e.g., a CBR threshold) with a usage percentage (e.g., as discussed herein in conjunction with FIGS. 1-3, 5-11, and 13). The circuit/module for comparing 1222 may then output the result of this determination (e.g., to the circuit/module for determining whether to use a resource pool 1224, the memory device 1208, or some other component of the apparatus 1200).

The circuit/module for determining whether to use a resource pool 1224 may include circuitry and/or programming (e.g., code for determining whether to use a resource pool 1234 stored on the storage medium 1204) adapted to perform several functions relating to, for example, determining whether to use a resource pool for communication. In some aspects, the circuit/module for determining whether to use a resource pool 1224 (e.g., a means for determining whether to use a resource pool) may correspond to, for example, a processing circuit.

Initially, the circuit/module for determining whether to use a resource pool 1224 may obtain information upon which the determination is to be based. For example, the circuit/module for determining whether to use a resource pool 1224 may obtain information about current use of a resource pool (e.g., from the circuit/module for comparing 1222, the memory device 1208, or some other component of the apparatus 1200). As a specific example, the circuit/module for determining whether to use a resource pool 1224 may obtain the results of a comparison of a usage percentage with a threshold. The circuit/module for determining whether to use a resource pool 1224 may then make the determination based on the obtained information. For example, the circuit/module for determining whether to use a resource pool 1224 may elect to use a resource pool for a second RAT if the use of the resource pool by a first RAT is less than or equal to the percentage (e.g., as discussed herein in conjunction with FIGS. 1-3, 5-11, and 13). The circuit/module for determining whether to use a resource pool 1224 may then output an indication of the determination (e.g., to the circuit/module for identifying 1226, the circuit/module for communicating 1228, the memory device 1208, or some other component of the apparatus 1200).

The circuit/module for identifying 1226 may include circuitry and/or programming (e.g., code for identifying 1236 stored on the storage medium 1204) adapted to perform several functions relating to, for example, identifying a subset of a resource pool. In some aspects, the circuit/module for identifying 1226 (e.g., a means for identifying) may correspond to, for example, a processing circuit.

Initially, the circuit/module for identifying 1226 may obtain information upon which the identification is to be based. For example, the circuit/module for identifying 1226 may determine which subset of a resource pool is not currently being used for communication. Thus, the circuit/module for identifying 1226 may initially determine whether one or more resources are being used (e.g., based on information from the circuit/module for determining a percentage 1220, the circuit/module for determining whether to use a resource pool 1224, the memory device 1208, or some other component of the apparatus 1200). The circuit/module for identifying 1226 can thus determine which of these resources should be used (e.g., as discussed herein in conjunction with FIGS. 1-3, 5-11, and 13). The circuit/module for identifying 1226 may then output an indication of the identification (e.g., to the circuit/module for communicating 1228, the memory device 1208, or some other component of the apparatus 1200).

The circuit/module for communicating 1228 may include circuitry and/or programming (e.g., code for communicating 1238 stored on the storage medium 1204) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1228 may communicate data via a subset of a resource pool. In some aspects, the circuit/module for communicating 1228 may communicate (e.g., receive) a scheduling assignment. In some aspects, the circuit/module for communicating 1228 may communicate via a V2X sidelink.

In some implementations where the communicating involves receiving information, the circuit/module for communicating 1228 receives information (e.g., from the communication interface 1202, the receiver 1216, the memory device 1208, some other component of the apparatus 1200, or some other device), processes (e.g., decodes) the information, and outputs the information to another component of the apparatus 1200 (e.g., the memory device 1208 or some other component). In some scenarios (e.g., if the circuit/module for communicating 1228 includes a receiver), the communicating involves the circuit/module for communicating 1228 receiving information directly from a device that transmitted the information (e.g., via radio frequency signaling or some other type of signaling suitable for the applicable communication medium).

In some implementations where the communicating involves sending information, the circuit/module for communicating 1228 obtains information (e.g., from the memory device 1208 or some other component of the apparatus 1200), processes (e.g., encodes) the information, and outputs the processed information. In some scenarios, the communicating involves sending the information to another component of the apparatus 1200 (e.g., the transmitter 1214, the communication interface 1202, or some other component) that will transmit the information to another device. In some scenarios (e.g., if the circuit/module for communicating 1228 includes a transmitter), the communicating involves the circuit/module for communicating 1228 transmitting the information directly to another device (e.g., the ultimate destination) via radio frequency signaling or some other type of signaling suitable for the applicable communication medium.

The circuit/module for communicating 1228 (e.g., a means for communicating) may take various forms. In some aspects, the circuit/module for communicating 1228 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1202 includes the circuit/module for communicating 1228 and/or the code for communicating 1238. In some implementations, the circuit/module for communicating 1228 and/or the code for communicating 1238 is configured to control the communication interface 1202 (e.g., a transceiver, a receiver, or a transmitter) to communicate the information.

Eighth Example Process

Figure 13:
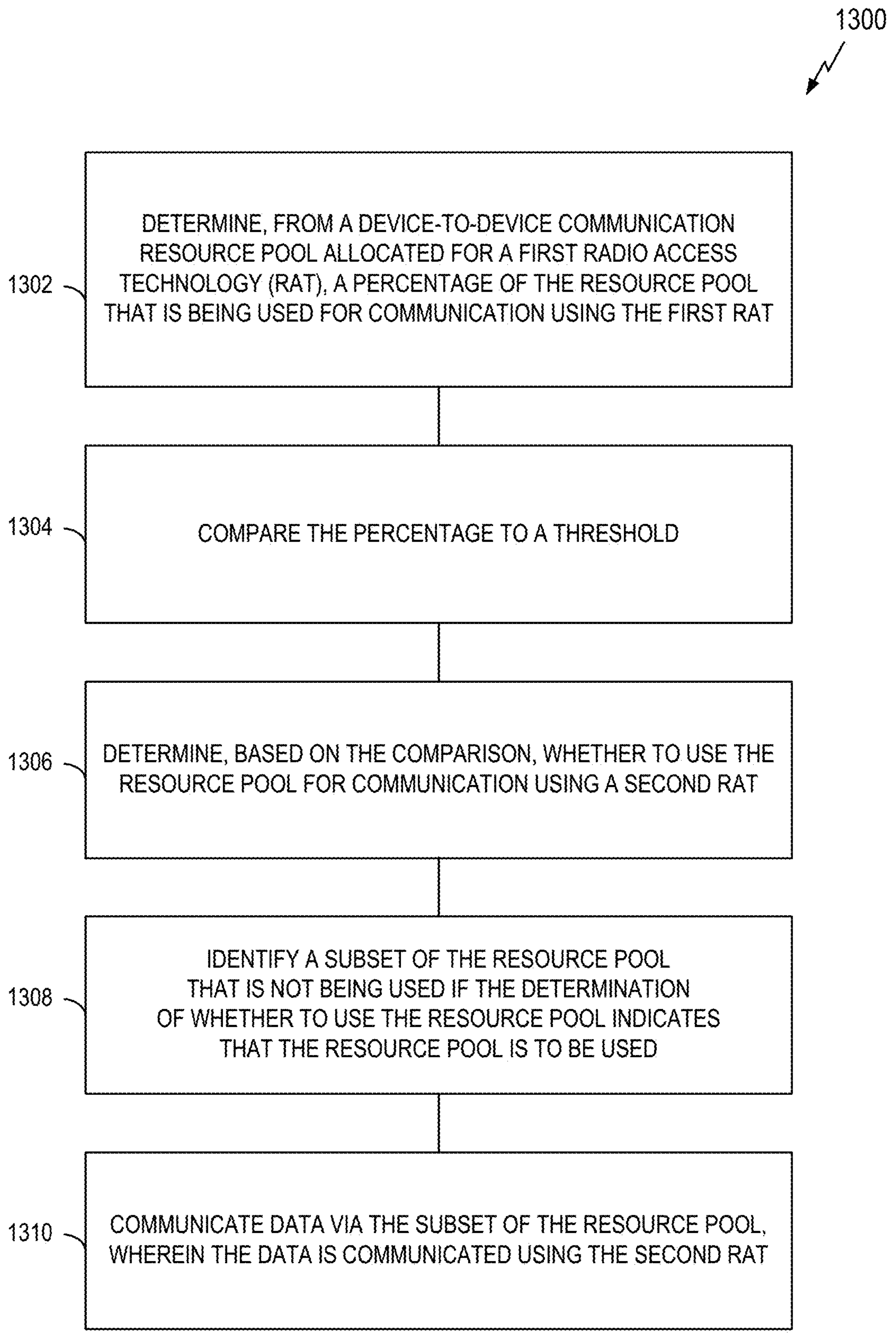
FIG. 13 is a flow diagram illustrating an example of a process for resource sharing in accordance with some aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in an NR V2X device, a UE, an access terminal, or some other suitable apparatus. Of course, in various aspects within the scope of the disclosure, the process 1300 may be implemented by any suitable apparatus capable of supporting communication-related operations.

At block 1302, an apparatus (e.g., an NR V2X device) determines, from a device-to-device communication resource pool allocated for a first radio access technology (RAT), a percentage of the resource pool that is being used for communication using the first RAT. In some aspects, the communication using the first RAT may include Vehicle-to-Everything (V2X) sidelink communication. In some aspects, the first RAT may include 3rd Generation Partnership Project (3GPP) Long Term Evolution (LTE) technology. In some aspects, the percentage may include a channel busy ratio (CBR) that indicates occupied radio blocks relative to total allocated radio blocks.

In some aspects, the determination of the percentage of the resource pool that is being used for communication using the first RAT may include: receiving at least one scheduling assignment including at least one indication; and identifying, based on the at least one indication, resources of the resource pool that are being used for communication using the second RAT.

In some implementations, the circuit/module for determining a percentage 1220 of FIG. 12 performs the operations of block 1302. In some implementations, the code for determining a percentage 1230 of FIG. 12 is executed to perform the operations of block 1302.

At block 1304, the apparatus compares the percentage to a threshold. In some aspects, the threshold may be a CBR threshold. In some aspects, the threshold may be one of a plurality of thresholds, where a first threshold of the plurality of thresholds is associated with a first priority and a second threshold of the plurality of thresholds is associated with a second priority.

In some implementations, the circuit/module for comparing 1222 of FIG. 12 performs the operations of block 1304. In some implementations, the code for comparing 1232 of FIG. 12 is executed to perform the operations of block 1304.

At block 1306, the apparatus determines, based on the comparison of block 1304, whether to use the resource pool for communication using a second RAT.

In some implementations, the circuit/module for determining whether to use a resource pool 1224 of FIG. 12 performs the operations of block 1306. In some implementations, the code for determining whether to use a resource pool 1234 of FIG. 12 is executed to perform the operations of block 1306.

At block 1308, the apparatus identifies a subset of the resource pool that is not being used if the determination of whether to use the resource pool at block 1306 indicates that the resource pool is to be used. In some aspects, the identification of the subset of the resource pool that is not being used may include: receiving at least one scheduling assignment; and identifying, based on the at least one scheduling assignment, resources of the resource pool that are being used.

In some implementations, the circuit/module for identifying 1226 of FIG. 12 performs the operations of block 1308. In some implementations, the code for identifying 1236 of FIG. 12 is executed to perform the operations of block 1308.

At block 1310, the apparatus communicates data via the subset of the resource pool, wherein the data is communicated using the second RAT. In some aspects, the communication using the second RAT may include Vehicle-to-Everything (V2X) sidelink communication.

In some implementations, the circuit/module for communicating 1228 of FIG. 12 performs the operations of block 1310. In some implementations, the code for communicating 1238 of FIG. 12 is executed to perform the operations of block 1310.

In some aspects, the process 1300 may include identifying a portion of the subset based on a bit map. In this case, the data may be communicated via the identified portion of the subset. In some aspects, the bit map may be one of a plurality of bit maps, where a first bit map of the plurality of bit maps is associated with a first priority and a second bit map of the plurality of bit maps is associated with a second priority.

In some aspects, the process 1300 may include, after communicating the data: determining, from the resource pool, a subsequent percentage of the resource pool that is being used for communication using the first RAT; comparing the subsequent percentage to the threshold; and determining, based on the comparison of the subsequent percentage to the threshold, to stop using the resource pool for the communication using the second RAT.

In some aspects, the process 1300 may include any combination of the above operations.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may include at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
- receiving, from at least one first device, at least one scheduling assignment (SA) for a device-to-device communication resource pool allocated for a first radio access technology (RAT);
- determining, based on the at least one SA, an indication of use of the resource pool, wherein the determination of the indication comprises identifying, based on the at least one SA, at least one first resource of the resource pool that is used by the at least one first device for first communication using the first RAT;
- comparing the indication to a threshold;
- determining, based on the comparison, to use the resource pool for communication by the apparatus using the second RAT;
- identifying a set of candidate resources from the resource pool for the communication by the apparatus using the second RAT, wherein the set of candidate resources excludes the at least one first resource of the resource pool that is used by the at least one first device for the first communication using the first RAT;
- using a listen-before-talk (LBT) operation to reserve at least one second resource of the set of candidate resources, wherein the at least one second resource excludes at least one third resource of the set of candidate resources identified by the LBT operation as being used by at least one second device for second communication using a second RAT; and
- communicating data via the at least one second resource using the second RAT.

2. The method of claim 1, wherein the indication comprises a percentage of the resource pool that is being used for communication using the first RAT.

3. The method of claim 2, wherein:
- the percentage comprises a channel busy ratio (CBR) that indicates occupied radio blocks relative to total allocated radio blocks; and
- the threshold comprises a CBR threshold.

4. The method of claim 1, further comprising:
- identifying the at least one second resource based on a bit map.

5. The method of claim 4, wherein:
- the bit map is one of a plurality of bit maps;
- a first bit map of the plurality of bit maps is associated with a first priority; and
- a second bit map of the plurality of bit maps is associated with a second priority.

6. The method of claim 1, further comprising:
- identifying a priority associated with the data; and
- selecting the threshold based on the identified priority.

7. The method of claim 1, wherein:
- the threshold is one of a plurality of thresholds;
- a first threshold of the plurality of thresholds is associated with a first priority; and
- a second threshold of the plurality of thresholds is associated with a second priority.

8. The method of claim 1, further comprising, after communicating the data:
- determining, from the resource pool, a subsequent indication of use of the resource pool;

comparing the subsequent indication to the threshold; and determining, based on the comparison of the subsequent indication to the threshold, to stop the communication of data via the resource pool using the second RAT.

9. The method of claim 1, wherein:

the first communication using the first RAT and the second communication using the second RAT comprise Vehicle-to-Everything (V2X) sidelink communication.

10. The method of claim 1, wherein:

the first RAT comprises 3rd Generation Partnership Project (3GPP) Long Term Evolution (LTE) technology.

11. An apparatus for communication comprising:

a memory; and a processor coupled to the memory, the processor and the memory configured to:

receive, from at least one first device, at least one scheduling assignment (SA) for a device-to-device communication resource pool allocated for a first radio access technology (RAT);

determine, based on the at least one SA, an indication of use of the resource pool, wherein the determination of the indication comprises identifying, based on the at least one SA, at least one first resource of the resource pool that is used by the at least one first device for first communication using the first RAT;

compare the indication to a threshold;

determine, based on the comparison, to use the resource pool for communication by the apparatus using the second RAT;

identify a set of candidate resources from the resource pool for the communication by the apparatus using the second RAT, wherein the set of candidate resources excludes the at least one first resource of the resource pool that is used by the at least one first device for the first communication using the first RAT;

use a listen-before-talk operation to reserve at least one second resource of the set of candidate resources, wherein the at least one second resource excludes at least one third resource of the set of candidate resources identified by the LBT operation as being used by at least one second device for second communication using a second RAT; and communicate data via the at least one second resource using the second RAT.

12. The apparatus of claim 11, wherein the indication comprises a percentage of the resource pool that is being used for communication using the first RAT.

13. The apparatus of claim 12, wherein:

the percentage comprises a channel busy ratio (CBR) that indicates occupied radio blocks relative to total allocated radio blocks; and the threshold comprises a CBR threshold.

14. The apparatus of claim 11, wherein:

the processor and the memory are further configured to identify the at least one second resource based on a bit map.

15. The apparatus of claim 11, wherein the processor and the memory are further configured to:

identify a priority associated with the data; and select the threshold based on the identified priority.

16. The apparatus of claim 11, wherein the processor and the memory are further configured to, after communication of the data:

determine, from the resource pool, a subsequent indication of use of the resource pool;

compare the subsequent indication to the threshold; and determine, based on the comparison of the subsequent indication to the threshold, to stop to stop the communication of data via the resource pool using the second RAT.

17. An apparatus for communication comprising:

means for receiving, from at least one first device, at least one scheduling assignment (SA) for a device-to-device communication resource pool allocated for a first radio access technology (RAT);

means for determining, based on the at least one SA, an indication of use of the resource pool, wherein the determination of the indication comprises identifying, based on the at least one SA, at least one first resource of the resource pool that is used by the at least one first device for first communication using the first RAT;

means for comparing the indication to a threshold;

means for determining, based on the comparison, to use the resource pool for communication by the apparatus using the second RAT;

means for identifying a set of candidate resources from the resource pool for the communication by the apparatus using the second RAT, wherein the set of candidate resources excludes the at least one first resource of the resource pool that is used by the at least one first device for the first communication using the first RAT;

means for using a listen-before-talk operation to reserve at least one second resource of the set of candidate resources, wherein the at least one second resource excludes at least one third resource of the set of candidate resources identified by the LBT operation as being used by at least one second device for second communication using a second RAT; and means for communicating data via the at least one second resource using the second RAT.

18. The apparatus of claim 17, further comprising:

means for identifying the at least one second resource based on a bit map.

19. The apparatus of claim 17, further comprising:

means for identifying a priority associated with the data; and means for selecting the threshold based on the identified priority.

20. A non-transitory computer-readable medium storing computer-executable code for communication by an apparatus, including code to:

receive, from at least one first device, at least one scheduling assignment (SA) for a device-to-device communication resource pool allocated for a first radio access technology (RAT);

determine, based on the at least one SA, an indication of use of the resource pool, wherein the determination of the indication comprises identifying, based on the at least one SA, at least one first resource of the resource pool that is used by the at least one first device for first communication using the first RAT;

compare the indication to a threshold;

determine, based on the comparison, to use the resource pool for communication by the apparatus using the second RAT;

identify a set of candidate resources from the resource pool for the communication by the apparatus using the second RAT, wherein the set of candidate resources excludes the at least one first resource of the resource pool that is used by the at least one first device for the first communication using the first RAT;

use a listen-before-talk operation to reserve at least one second resource of the set of candidate resources, wherein the at least one second resource excludes at least one third resource of the set of candidate resources identified by the LBT operation as being used by at least one second device for second communication using a second RAT; and communicate data via the at least one second resource using the second RAT.

* * * * *